United States Patent
Imes et al.

(10) Patent No.: US 10,250,520 B2
(45) Date of Patent: Apr. 2, 2019

(54) CUSTOMER ENGAGEMENT PLATFORM AND PORTAL HAVING MULTI-MEDIA CAPABILITIES

(75) Inventors: Kevin R. Imes, Austin, TX (US); James Hollister, Round Rock, TX (US); Jarod Addison, Austin, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/600,086

(22) Filed: Aug. 30, 2012

(65) Prior Publication Data

US 2013/0054758 A1 Feb. 28, 2013

Related U.S. Application Data

(60) Provisional application No. 61/529,018, filed on Aug. 30, 2011, provisional application No. 61/606,728, filed on Mar. 5, 2012.

(51) Int. Cl.
*H04L 12/911* (2013.01)
*H04L 12/28* (2006.01)
(Continued)

(52) U.S. Cl.
CPC .......... *H04L 47/70* (2013.01); *H04L 12/2827* (2013.01); *G06F 17/30029* (2013.01);
(Continued)

(58) Field of Classification Search
USPC ....... 709/203, 208, 217, 219, 223, 224, 231, 709/232
See application file for complete search history.

(56) References Cited

U.S. PATENT DOCUMENTS

| 1,568,584 A | 1/1926 | Blankenship |
| 2,042,633 A | 6/1936 | Richardson |

(Continued)

FOREIGN PATENT DOCUMENTS

| EP | 1814260 A2 | 1/2007 |
| EP | 1814260 A2 | 8/2007 |

(Continued)

OTHER PUBLICATIONS

Slavin, Alison Jane and Trundle, Joseph Scott, Remote Thermostat Control/Energy Monitoring, U.S. Appl. No. 61/179,224, filed May 18, 2009; 14 pages.

(Continued)

*Primary Examiner* — Barbara B Anyan
(74) *Attorney, Agent, or Firm* — Staas & Halsey LLP

(57) ABSTRACT

A system for managing a customer engagement portal associated with a site includes a media manager associated with the site and at least one network device associated with the site. The network device and the media manager are in communication to wirelessly transfer streams of media. The network device is configured to output streams of media. The site also has a mobile device associated therewith that is configured to initiate a change in an operating condition of the at least one network device for a location remote from the site. The network device is configured to output the streams of media simultaneously with the operating condition of the network deceive being changed.

29 Claims, 11 Drawing Sheets

(51) Int. Cl.
G06F 17/30 (2006.01)
H04L 12/24 (2006.01)
(52) U.S. Cl.
CPC .... *G06F 17/30861* (2013.01); *H04L 41/0253* (2013.01); *H04L 2012/285* (2013.01); *H04L 2012/2849* (2013.01)

(56) References Cited

U.S. PATENT DOCUMENTS

| | | | |
|---|---|---|---|
| 2,427,965 A | 9/1947 | Henderson | |
| 2,931,006 A | 3/1960 | Klumpp, Jr. | |
| 2,960,677 A | 11/1960 | Stearn et al. | |
| 3,194,957 A | 7/1965 | Caldwell et al. | |
| 3,237,148 A | 2/1966 | Ege | |
| 3,531,759 A | 9/1970 | Hansen | |
| 3,675,183 A | 7/1972 | Drake | |
| 3,808,602 A | 4/1974 | Hoeffel et al. | |
| 4,407,447 A | 10/1983 | Sayegh | |
| 4,437,716 A | 3/1984 | Cooper | |
| 4,497,031 A | 1/1985 | Froehling et al. | |
| 4,645,286 A | 2/1987 | Isban et al. | |
| 5,127,575 A | 7/1992 | Beerbaum | |
| 5,274,571 A | 12/1993 | Hesse et al. | |
| 5,289,362 A | 2/1994 | Liebl et al. | |
| 5,461,390 A | 10/1995 | Hoshen | |
| 5,476,221 A | 12/1995 | Seymour | |
| 5,537,339 A | 7/1996 | Naganuma et al. | |
| 5,544,036 A | 8/1996 | Brown, Jr. et al. | |
| 5,566,084 A | 10/1996 | Cmar | |
| 5,595,342 A | 1/1997 | McNair et al. | |
| 5,682,949 A | 11/1997 | Ratcliffe et al. | |
| 5,725,148 A | 3/1998 | Hartman | |
| 5,729,442 A | 3/1998 | Frantz | |
| 5,764,146 A | 6/1998 | Baldwin et al. | |
| 5,812,949 A | 9/1998 | Taketsugu | |
| 5,819,840 A | 10/1998 | Wilson et al. | |
| 5,884,072 A | 3/1999 | Rasmussen | |
| 5,964,625 A | 10/1999 | Farley | |
| 5,987,379 A | 11/1999 | Smith | |
| 6,014,080 A | 1/2000 | Layson, Jr. | |
| 6,073,019 A | 6/2000 | Lowdon | |
| 6,108,614 A | 8/2000 | Lincoln et al. | |
| 6,128,661 A | 10/2000 | Flanagin et al. | |
| 6,175,078 B1 | 1/2001 | Bambardekar et al. | |
| 6,353,180 B1 | 3/2002 | Debartolo, Jr. et al. | |
| 6,400,956 B1 | 6/2002 | Richton | |
| 6,442,639 B1 | 8/2002 | McElhattan | |
| 6,478,233 B1 | 11/2002 | Shah | |
| 6,483,028 B2 | 11/2002 | Debartolo, Jr. et al. | |
| 6,553,418 B1 | 4/2003 | Collins et al. | |
| 6,623,311 B1 | 9/2003 | Dehan | |
| 6,636,893 B1 | 10/2003 | Fong | |
| 6,684,087 B1 | 1/2004 | Yu et al. | |
| 6,785,542 B1 | 8/2004 | Blight et al. | |
| 6,785,630 B2 | 8/2004 | Kolk et al. | |
| 6,850,252 B1 | 2/2005 | Hoffberg | |
| 6,868,293 B1 | 3/2005 | Schurr et al. | |
| 6,975,958 B2 | 12/2005 | Bohrer et al. | |
| 6,976,366 B2 | 12/2005 | Starling et al. | |
| 6,980,659 B1 | 12/2005 | Barnum | |
| 6,999,757 B2 | 2/2006 | Bates et al. | |
| 7,016,751 B2 | 3/2006 | Nordquist et al. | |
| 7,031,945 B1 | 4/2006 | Donner | |
| 7,082,460 B2 | 7/2006 | Hansen et al. | |
| 7,083,109 B2 | 8/2006 | Pouchak | |
| 7,099,483 B2 * | 8/2006 | Inagaki | 381/77 |
| 7,114,554 B2 | 10/2006 | Bergman et al. | |
| 7,127,328 B2 | 10/2006 | Ransom | |
| 7,127,734 B1 | 10/2006 | Amit | |
| 7,130,719 B2 | 10/2006 | Ehlers et al. | |
| 7,139,564 B2 | 11/2006 | Hebert | |
| 7,140,551 B2 | 11/2006 | De Pauw et al. | |
| 7,155,305 B2 | 12/2006 | Hayes et al. | |
| 7,159,789 B2 | 1/2007 | Schwendinger et al. | |
| 7,188,003 B2 | 3/2007 | Ransom et al. | |
| 7,197,011 B2 | 3/2007 | Fong | |
| 7,216,021 B2 | 5/2007 | Matsubara et al. | |
| 7,222,800 B2 | 5/2007 | Wruck | |
| 7,224,966 B2 | 5/2007 | Caspi et al. | |
| 7,257,397 B2 | 8/2007 | Shamoon et al. | |
| 7,343,226 B2 | 3/2008 | Ehlers et al. | |
| 7,349,761 B1 | 3/2008 | Cruse | |
| 7,363,053 B2 | 4/2008 | Dalton et al. | |
| 7,403,838 B2 | 7/2008 | Deen et al. | |
| 7,444,401 B1 | 10/2008 | Keyghobad et al. | |
| 7,451,017 B2 | 11/2008 | McNally | |
| 7,460,827 B2 | 12/2008 | Schuster et al. | |
| 7,477,617 B2 | 1/2009 | Chen et al. | |
| 7,510,126 B2 | 3/2009 | Rossi et al. | |
| 7,525,425 B2 | 4/2009 | Diem | |
| 7,526,539 B1 | 4/2009 | Hsu | |
| 7,554,437 B2 | 6/2009 | Axelsen | |
| 7,565,225 B2 | 7/2009 | Dushane | |
| 7,567,844 B2 | 7/2009 | Thomas et al. | |
| 7,574,208 B2 | 8/2009 | Hanson et al. | |
| 7,574,283 B2 | 8/2009 | Wang et al. | |
| 7,590,703 B2 | 9/2009 | Cashman et al. | |
| 7,644,591 B2 | 1/2010 | Singh et al. | |
| 7,665,670 B2 | 2/2010 | Ahmed | |
| 7,668,532 B2 | 2/2010 | Shamoon et al. | |
| 7,671,544 B2 | 3/2010 | Clark et al. | |
| 7,693,581 B2 | 4/2010 | Callaghan et al. | |
| 7,706,928 B1 | 4/2010 | Howell et al. | |
| 7,715,951 B2 | 5/2010 | Forbes et al. | |
| 7,747,739 B2 | 6/2010 | Bridges et al. | |
| 7,752,309 B2 | 7/2010 | Keyghobad et al. | |
| 7,761,910 B2 | 7/2010 | Ransom | |
| 7,775,453 B2 | 8/2010 | Hara | |
| 7,783,738 B2 | 8/2010 | Keyghobad et al. | |
| 7,792,946 B2 | 9/2010 | Keyghobad et al. | |
| 7,798,417 B2 | 9/2010 | Snyder et al. | |
| 7,812,766 B2 | 10/2010 | Leblanc et al. | |
| 7,813,831 B2 | 10/2010 | McCoy et al. | |
| 7,865,252 B2 | 1/2011 | Clayton | |
| 7,881,816 B2 | 2/2011 | Mathiesen et al. | |
| 7,884,727 B2 | 2/2011 | Tran | |
| 7,886,166 B2 | 2/2011 | Schnekendorf et al. | |
| 7,895,257 B2 | 2/2011 | Helal et al. | |
| 7,908,019 B2 | 3/2011 | Ebrom et al. | |
| 7,908,116 B2 | 3/2011 | Steinberg et al. | |
| 7,908,117 B2 | 3/2011 | Steinberg et al. | |
| 7,912,559 B2 | 3/2011 | McCoy et al. | |
| 7,917,914 B2 | 3/2011 | McCoy et al. | |
| 7,918,406 B2 | 4/2011 | Rosen | |
| 7,921,429 B2 | 4/2011 | McCoy et al. | |
| 7,941,530 B2 | 5/2011 | Ha et al. | |
| 7,949,615 B2 | 5/2011 | Ehlers et al. | |
| 7,953,518 B2 | 5/2011 | Kansal et al. | |
| 7,973,707 B2 | 7/2011 | Verechtchiagine | |
| 7,975,051 B2 | 7/2011 | Saint Clair et al. | |
| 7,979,163 B2 | 7/2011 | Terlson et al. | |
| 8,005,780 B2 | 8/2011 | McCoy et al. | |
| 8,010,237 B2 | 8/2011 | Cheung et al. | |
| 8,010,418 B1 | 8/2011 | Lee | |
| 8,010,812 B2 | 8/2011 | Forbes, Jr. et al. | |
| 8,014,722 B2 | 9/2011 | Abel | |
| 8,019,445 B2 | 9/2011 | Marhoefer | |
| 8,024,073 B2 | 9/2011 | Imes et al. | |
| 8,028,049 B1 | 9/2011 | Ellis et al. | |
| 8,028,302 B2 | 9/2011 | Glotzbach et al. | |
| 8,032,233 B2 | 10/2011 | Forbes, Jr. et al. | |
| 8,042,048 B2 | 10/2011 | Wilson et al. | |
| 8,049,592 B2 | 11/2011 | Wang et al. | |
| 8,063,775 B2 | 11/2011 | Reed et al. | |
| 8,082,065 B2 | 12/2011 | Imes et al. | |
| 8,090,477 B1 | 1/2012 | Steinberg | |
| 8,091,765 B2 | 1/2012 | Jiang et al. | |
| 8,091,795 B1 | 1/2012 | McLellan et al. | |
| 8,099,195 B2 | 1/2012 | Imes et al. | |
| 8,099,198 B2 | 1/2012 | Gurin | |
| 8,108,076 B2 | 1/2012 | Imes et al. | |
| 8,117,299 B2 | 2/2012 | Narayanaswami et al. | |
| 8,126,685 B2 | 2/2012 | Nasle | |
| 8,131,401 B2 | 3/2012 | Nasle | |

(56) References Cited

U.S. PATENT DOCUMENTS

| | | |
|---|---|---|
| 8,140,279 B2 | 3/2012 | Subbloie |
| 8,140,667 B2 | 3/2012 | Keyghobad et al. |
| 8,176,112 B2 | 5/2012 | Hicks, IIII et al. |
| 8,204,979 B2 | 6/2012 | Vutharkar et al. |
| 8,214,270 B2 | 7/2012 | Schaefer et al. |
| 8,280,556 B2 | 10/2012 | Besore et al. |
| 8,306,634 B2 | 11/2012 | Nguyen et al. |
| 8,350,694 B1 | 1/2013 | Trundle et al. |
| 8,406,783 B2 | 3/2013 | Eitan et al. |
| 8,406,933 B2 | 3/2013 | Nagel et al. |
| 2002/0073217 A1* | 6/2002 | Ma et al. ............... 709/230 |
| 2002/0147006 A1 | 10/2002 | Coon et al. |
| 2002/0194500 A1 | 12/2002 | Bajikar |
| 2002/0196151 A1 | 12/2002 | Troxler |
| 2002/0198984 A1 | 12/2002 | Goldstein et al. |
| 2003/0084098 A1* | 5/2003 | Lavin ............... G06F 3/021 709/203 |
| 2003/0105854 A1* | 6/2003 | Thorsteinsson ........ G06F 9/542 709/223 |
| 2003/0120817 A1 | 6/2003 | Ott et al. |
| 2003/0122684 A1 | 7/2003 | Porter et al. |
| 2003/0149734 A1 | 8/2003 | Aaltonen et al. |
| 2003/0210126 A1 | 11/2003 | Kanazawa |
| 2004/0034484 A1 | 2/2004 | Solomita, Jr. et al. |
| 2004/0078153 A1 | 4/2004 | Bartone et al. |
| 2004/0087314 A1 | 5/2004 | Duncan |
| 2004/0119600 A1 | 6/2004 | Hampton |
| 2004/0133314 A1 | 7/2004 | Ehlers et al. |
| 2004/0193329 A1 | 9/2004 | Ransom et al. |
| 2004/0215490 A1* | 10/2004 | Duchon ............... G06F 19/322 705/2 |
| 2005/0038326 A1 | 2/2005 | Mathur |
| 2005/0040247 A1 | 2/2005 | Pouchak |
| 2005/0040250 A1 | 2/2005 | Wruck |
| 2005/0044427 A1 | 2/2005 | Dunstan et al. |
| 2005/0060575 A1 | 3/2005 | Trethewey et al. |
| 2005/0090267 A1 | 4/2005 | Kotzin |
| 2005/0131583 A1 | 6/2005 | Ransom |
| 2005/0143863 A1 | 6/2005 | Ruane et al. |
| 2005/0144437 A1 | 6/2005 | Ransom et al. |
| 2005/0172056 A1 | 8/2005 | Ahn |
| 2005/0194457 A1 | 9/2005 | Dolan |
| 2005/0242945 A1* | 11/2005 | Perkinson ............... 340/531 |
| 2005/0246561 A1 | 11/2005 | Wu et al. |
| 2006/0012489 A1 | 1/2006 | Yokota et al. |
| 2006/0063522 A1 | 3/2006 | McFarland |
| 2006/0080408 A1* | 4/2006 | Istvan ............... G06F 17/30861 709/219 |
| 2006/0097063 A1 | 5/2006 | Zeevi |
| 2006/0099971 A1 | 5/2006 | Staton et al. |
| 2006/0102732 A1 | 5/2006 | Garrett et al. |
| 2006/0122715 A1 | 6/2006 | Schroeder et al. |
| 2006/0142880 A1 | 6/2006 | Deen et al. |
| 2006/0161635 A1 | 7/2006 | Lamkin et al. |
| 2006/0161639 A1* | 7/2006 | Kato ............... H04L 29/06 709/219 |
| 2006/0179079 A1 | 8/2006 | Kolehmainen |
| 2006/0253894 A1 | 11/2006 | Bookman et al. |
| 2006/0265489 A1 | 11/2006 | Moore |
| 2006/0276175 A1 | 12/2006 | Chandran |
| 2006/0283965 A1 | 12/2006 | Mueller et al. |
| 2006/0288300 A1* | 12/2006 | Chambers ............ G06F 3/04886 715/744 |
| 2007/0032225 A1 | 2/2007 | Konicek et al. |
| 2007/0037554 A1 | 2/2007 | Feeny |
| 2007/0037605 A1 | 2/2007 | Logan |
| 2007/0043477 A1 | 2/2007 | Ehlers et al. |
| 2007/0043478 A1 | 2/2007 | Ehlers et al. |
| 2007/0045431 A1 | 3/2007 | Chapman et al. |
| 2007/0054616 A1 | 3/2007 | Culbert |
| 2007/0055760 A1 | 3/2007 | McCoy et al. |
| 2007/0060171 A1 | 3/2007 | Sudit et al. |
| 2007/0061050 A1 | 3/2007 | Hoffknecht |
| 2007/0061266 A1 | 3/2007 | Moore et al. |
| 2007/0061487 A1 | 3/2007 | Moore et al. |
| 2007/0112939 A1 | 5/2007 | Wilson et al. |
| 2007/0114295 A1 | 5/2007 | Jenkins |
| 2007/0115902 A1 | 5/2007 | Shamoon et al. |
| 2007/0124026 A1 | 5/2007 | Troxell et al. |
| 2007/0136217 A1 | 6/2007 | Johnson et al. |
| 2007/0155401 A1 | 7/2007 | Ward et al. |
| 2007/0156265 A1 | 7/2007 | McCoy et al. |
| 2007/0156864 A1 | 7/2007 | McCoy et al. |
| 2007/0156882 A1 | 7/2007 | McCoy et al. |
| 2007/0158442 A1 | 7/2007 | Chapman, Jr. et al. |
| 2007/0160022 A1 | 7/2007 | McCoy et al. |
| 2007/0162158 A1 | 7/2007 | McCoy et al. |
| 2007/0168486 A1 | 7/2007 | McCoy et al. |
| 2007/0176771 A1 | 8/2007 | Doyle |
| 2007/0188319 A1 | 8/2007 | Upton |
| 2007/0197236 A1 | 8/2007 | Ahn et al. |
| 2007/0221741 A1 | 9/2007 | Wagner et al. |
| 2007/0240173 A1 | 10/2007 | McCoy et al. |
| 2007/0241203 A1 | 10/2007 | Wagner et al. |
| 2007/0249319 A1 | 10/2007 | Faulkner et al. |
| 2007/0273307 A1 | 11/2007 | Westrick et al. |
| 2007/0274241 A1 | 11/2007 | Brothers |
| 2007/0282748 A1 | 12/2007 | Saint Clair et al. |
| 2007/0285510 A1 | 12/2007 | Lipton et al. |
| 2007/0287410 A1 | 12/2007 | Bae et al. |
| 2007/0287473 A1 | 12/2007 | Dupary |
| 2007/0288610 A1 | 12/2007 | Saint Clair et al. |
| 2007/0288975 A1 | 12/2007 | Cashman et al. |
| 2008/0004904 A1 | 1/2008 | Tran |
| 2008/0017722 A1 | 1/2008 | Snyder et al. |
| 2008/0046878 A1 | 2/2008 | Anderson |
| 2008/0082838 A1 | 4/2008 | Achariyakosol et al. |
| 2008/0099568 A1 | 5/2008 | Nicodem et al. |
| 2008/0103610 A1 | 5/2008 | Ebrom et al. |
| 2008/0104208 A1 | 5/2008 | Ebrom et al. |
| 2008/0104212 A1 | 5/2008 | Ebrom et al. |
| 2008/0109307 A1* | 5/2008 | Ullah ............... G06Q 30/02 705/14.66 |
| 2008/0109830 A1 | 5/2008 | Giozbach et al. |
| 2008/0127325 A1 | 5/2008 | Ebrom et al. |
| 2008/0137670 A1 | 6/2008 | Ebrom et al. |
| 2008/0177678 A1 | 7/2008 | Di Martini et al. |
| 2008/0177994 A1 | 7/2008 | Mayer |
| 2008/0188963 A1 | 8/2008 | McCoy |
| 2008/0218307 A1 | 9/2008 | Schoettle |
| 2008/0219186 A1 | 9/2008 | Bell et al. |
| 2008/0219227 A1 | 9/2008 | Michaelis |
| 2008/0219239 A1 | 9/2008 | Bell et al. |
| 2008/0221737 A1 | 9/2008 | Josephson et al. |
| 2008/0249642 A1* | 10/2008 | Chen ............... 700/17 |
| 2008/0262820 A1 | 10/2008 | Nasle |
| 2008/0270562 A1* | 10/2008 | Jin ............... H04L 67/025 709/208 |
| 2008/0271123 A1 | 10/2008 | Ollis et al. |
| 2008/0272934 A1 | 11/2008 | Wang et al. |
| 2008/0277486 A1 | 11/2008 | Seem et al. |
| 2008/0277487 A1 | 11/2008 | Mueller et al. |
| 2008/0281472 A1 | 11/2008 | Podgorny et al. |
| 2008/0281666 A1 | 11/2008 | Kessman et al. |
| 2008/0291855 A1 | 11/2008 | Bata et al. |
| 2008/0305644 A1 | 12/2008 | Noda et al. |
| 2008/0313310 A1 | 12/2008 | Vasa et al. |
| 2009/0001182 A1 | 1/2009 | Siddaramanna et al. |
| 2009/0005061 A1 | 1/2009 | Ward et al. |
| 2009/0012704 A1 | 1/2009 | Franco et al. |
| 2009/0037938 A1 | 2/2009 | Frank |
| 2009/0062970 A1 | 3/2009 | Forbes, Jr. et al. |
| 2009/0063122 A1 | 3/2009 | Nasle |
| 2009/0063228 A1 | 3/2009 | Forbes, Jr. et al. |
| 2009/0065596 A1 | 3/2009 | Seem et al. |
| 2009/0076749 A1 | 3/2009 | Nasle |
| 2009/0082888 A1* | 3/2009 | Johansen ............... 700/94 |
| 2009/0083167 A1 | 3/2009 | Subbloie |
| 2009/0093688 A1 | 4/2009 | Mathur |
| 2009/0098857 A1 | 4/2009 | De Atley |
| 2009/0098880 A1 | 4/2009 | Lindquist |
| 2009/0100492 A1 | 4/2009 | Hicks, III et al. |
| 2009/0103535 A1 | 4/2009 | McCoy et al. |

(56) References Cited

U.S. PATENT DOCUMENTS

| | | |
|---|---|---|
| 2009/0112522 A1 | 4/2009 | Rasmussen |
| 2009/0113037 A1 | 4/2009 | Pouchak |
| 2009/0129301 A1 | 5/2009 | Belimpasakis |
| 2009/0132070 A1 | 5/2009 | Ebrom et al. |
| 2009/0135836 A1 | 5/2009 | Veillette |
| 2009/0138099 A1 | 5/2009 | Veillette |
| 2009/0157529 A1 | 6/2009 | Ehlers et al. |
| 2009/0160626 A1 | 6/2009 | Jeon et al. |
| 2009/0164049 A1 | 6/2009 | Nibler et al. |
| 2009/0187499 A1 | 7/2009 | Mulder et al. |
| 2009/0193217 A1 | 7/2009 | Korecki et al. |
| 2009/0195349 A1 | 8/2009 | Frader-Thompson et al. |
| 2009/0204644 A1* | 8/2009 | Kodimer ............. H04N 1/0035 |
| 2009/0204837 A1 | 8/2009 | Raval et al. |
| 2009/0222839 A1* | 9/2009 | Ferlitsch ............... G06F 11/079 |
| | | 719/318 |
| 2009/0240381 A1 | 9/2009 | Lane |
| 2009/0248702 A1* | 10/2009 | Schwartz .......... G06F 17/30029 |
| 2009/0267787 A1 | 10/2009 | Pryor et al. |
| 2009/0270138 A1 | 10/2009 | Raveendran |
| 2009/0298514 A1* | 12/2009 | Ullah ....................... G01S 5/02 |
| | | 455/456.5 |
| 2009/0302994 A1 | 12/2009 | Rhee et al. |
| 2009/0305644 A1 | 12/2009 | Rhee et al. |
| 2009/0312968 A1 | 12/2009 | Phillips et al. |
| 2009/0316671 A1 | 12/2009 | Rolf et al. |
| 2010/0017126 A1 | 1/2010 | Holcman et al. |
| 2010/0034386 A1 | 2/2010 | Choong et al. |
| 2010/0035587 A1 | 2/2010 | Bennett |
| 2010/0035613 A1 | 2/2010 | Schroter |
| 2010/0063867 A1 | 3/2010 | Proctor, Jr. et al. |
| 2010/0066507 A1 | 3/2010 | Myllymaeki |
| 2010/0069035 A1 | 3/2010 | Johnson |
| 2010/0069087 A1 | 3/2010 | Chow et al. |
| 2010/0070100 A1 | 3/2010 | Finlinson et al. |
| 2010/0070101 A1 | 3/2010 | Benes et al. |
| 2010/0075656 A1 | 3/2010 | Howarter et al. |
| 2010/0081375 A1 | 4/2010 | Rosenblatt et al. |
| 2010/0081468 A1 | 4/2010 | Brothers |
| 2010/0082174 A1 | 4/2010 | Weaver |
| 2010/0082176 A1 | 4/2010 | Chang |
| 2010/0082431 A1 | 4/2010 | Ramer et al. |
| 2010/0087932 A1 | 4/2010 | McCoy et al. |
| 2010/0088261 A1 | 4/2010 | Montalvo |
| 2010/0094475 A1 | 4/2010 | Masters et al. |
| 2010/0094737 A1 | 4/2010 | Lambird |
| 2010/0099410 A1 | 4/2010 | Sweeney et al. |
| 2010/0100253 A1 | 4/2010 | Fausak et al. |
| 2010/0113061 A1 | 5/2010 | Holcman |
| 2010/0115314 A1 | 5/2010 | Sultenfuss |
| 2010/0121499 A1 | 5/2010 | Besore et al. |
| 2010/0123414 A1 | 5/2010 | Antonopoulos |
| 2010/0127854 A1 | 5/2010 | Helvick et al. |
| 2010/0127889 A1 | 5/2010 | Vogel et al. |
| 2010/0130178 A1 | 5/2010 | Bennett et al. |
| 2010/0130213 A1 | 5/2010 | Vendrow et al. |
| 2010/0138764 A1 | 6/2010 | Hatambeiki et al. |
| 2010/0141437 A1 | 6/2010 | Karam et al. |
| 2010/0145534 A1 | 6/2010 | Forbes, Jr. et al. |
| 2010/0152997 A1 | 6/2010 | De Silva et al. |
| 2010/0156665 A1 | 6/2010 | Krzyzanowski et al. |
| 2010/0159936 A1 | 6/2010 | Brisbois et al. |
| 2010/0161148 A1 | 6/2010 | Forbes, Jr. et al. |
| 2010/0161149 A1 | 6/2010 | Nguyen et al. |
| 2010/0164713 A1 | 7/2010 | Wedig et al. |
| 2010/0165861 A1 | 7/2010 | Rrdland et al. |
| 2010/0169030 A1 | 7/2010 | Parlos et al. |
| 2010/0174643 A1 | 7/2010 | Schaefer et al. |
| 2010/0179670 A1 | 7/2010 | Forbes, Jr. et al. |
| 2010/0179672 A1 | 7/2010 | Beckmann et al. |
| 2010/0179708 A1 | 7/2010 | Watson et al. |
| 2010/0187219 A1 | 7/2010 | Besore et al. |
| 2010/0188239 A1 | 7/2010 | Rockwell |
| 2010/0188279 A1 | 7/2010 | Shamilian et al. |
| 2010/0191352 A1 | 7/2010 | Quail |
| 2010/0193592 A1 | 8/2010 | Simon et al. |
| 2010/0198713 A1 | 8/2010 | Forbes, Jr. et al. |
| 2010/0207728 A1 | 8/2010 | Roscoe et al. |
| 2010/0217450 A1 | 8/2010 | Beal et al. |
| 2010/0217451 A1 | 8/2010 | Kouda et al. |
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217642 A1 | 8/2010 | Crabtree et al. |
| 2010/0217651 A1 | 8/2010 | Crabtree et al. |
| 2010/0217837 A1 | 8/2010 | Ansari et al. |
| 2010/0218108 A1 | 8/2010 | Crabtree et al. |
| 2010/0222935 A1 | 9/2010 | Forbes, Jr. et al. |
| 2010/0228854 A1 | 9/2010 | Morrison et al. |
| 2010/0235008 A1 | 9/2010 | Forbes, Jr. et al. |
| 2010/0241275 A1 | 9/2010 | Crawford et al. |
| 2010/0249955 A1 | 9/2010 | Sitton |
| 2010/0250590 A1 | 9/2010 | Galvin |
| 2010/0256823 A1 | 10/2010 | Cherukuri et al. |
| 2010/0257539 A1 | 10/2010 | Narayanan et al. |
| 2010/0261465 A1 | 10/2010 | Rhoads et al. |
| 2010/0262298 A1 | 10/2010 | Johnson et al. |
| 2010/0262299 A1 | 10/2010 | Cheung et al. |
| 2010/0262336 A1 | 10/2010 | Rivas et al. |
| 2010/0272192 A1 | 10/2010 | Varadarajan et al. |
| 2010/0289643 A1 | 11/2010 | Trundle et al. |
| 2010/0299265 A1 | 11/2010 | Walters et al. |
| 2010/0299517 A1 | 11/2010 | Jukic et al. |
| 2010/0305773 A1 | 12/2010 | Cohen |
| 2010/0315235 A1 | 12/2010 | Adegoke et al. |
| 2010/0315438 A1 | 12/2010 | Horodezky et al. |
| 2010/0317332 A1 | 12/2010 | Bathiche et al. |
| 2010/0317371 A1 | 12/2010 | Westerinen et al. |
| 2010/0318198 A1 | 12/2010 | Smith et al. |
| 2010/0324956 A1 | 12/2010 | Lopez et al. |
| 2010/0324962 A1 | 12/2010 | Nesler et al. |
| 2010/0332373 A1 | 12/2010 | Crabtree et al. |
| 2011/0004350 A1 | 1/2011 | Cheifetz et al. |
| 2011/0004355 A1 | 1/2011 | Wang et al. |
| 2011/0004513 A1 | 1/2011 | Hoffberg |
| 2011/0015797 A1 | 1/2011 | Gilstrap |
| 2011/0015802 A1 | 1/2011 | Imes |
| 2011/0016023 A1 | 1/2011 | Zakas |
| 2011/0022239 A1 | 1/2011 | Forbes, Jr. et al. |
| 2011/0022242 A1 | 1/2011 | Bukhin et al. |
| 2011/0022519 A1* | 1/2011 | Pan ..................... G06Q 30/02 |
| | | 705/51 |
| 2011/0029655 A1 | 2/2011 | Forbes, Jr. et al. |
| 2011/0030016 A1 | 2/2011 | Pino, Jr. et al. |
| 2011/0039518 A1 | 2/2011 | Maria |
| 2011/0040666 A1 | 2/2011 | Crabtree et al. |
| 2011/0046792 A1 | 2/2011 | Imes et al. |
| 2011/0046798 A1 | 2/2011 | Imes et al. |
| 2011/0046799 A1 | 2/2011 | Imes et al. |
| 2011/0046800 A1 | 2/2011 | Imes et al. |
| 2011/0046801 A1 | 2/2011 | Imes et al. |
| 2011/0047482 A1 | 2/2011 | Arthurs et al. |
| 2011/0051823 A1 | 3/2011 | Imes et al. |
| 2011/0054699 A1 | 3/2011 | Imes et al. |
| 2011/0054710 A1 | 3/2011 | Imes et al. |
| 2011/0061014 A1 | 3/2011 | Frader-Thompson et al. |
| 2011/0063126 A1 | 3/2011 | Kennedy et al. |
| 2011/0063999 A1 | 3/2011 | Erdmann et al. |
| 2011/0069719 A1 | 3/2011 | Fries, IV et al. |
| 2011/0077789 A1 | 3/2011 | Sun |
| 2011/0098869 A1 | 4/2011 | Seo et al. |
| 2011/0106326 A1 | 5/2011 | Anunobi et al. |
| 2011/0106327 A1 | 5/2011 | Zhou et al. |
| 2011/0106681 A1 | 5/2011 | Cockerell et al. |
| 2011/0113090 A1 | 5/2011 | Peeri |
| 2011/0115875 A1 | 5/2011 | Sadwick et al. |
| 2011/0117878 A1 | 5/2011 | Barash et al. |
| 2011/0117927 A1 | 5/2011 | Doyle |
| 2011/0138024 A1 | 6/2011 | Chen et al. |
| 2011/0148626 A1 | 6/2011 | Acevedo |
| 2011/0153525 A1 | 6/2011 | Benco et al. |
| 2011/0160881 A1 | 6/2011 | Grey |
| 2011/0172837 A1 | 7/2011 | Forbes, Jr. |
| 2011/0173542 A1 | 7/2011 | Imes et al. |

(56) References Cited

U.S. PATENT DOCUMENTS

| | | | |
|---|---|---|---|
| 2011/0202185 A1 | 8/2011 | Imes et al. | |
| 2011/0202195 A1 | 8/2011 | Finch et al. | |
| 2011/0202293 A1 | 8/2011 | Kobraei et al. | |
| 2011/0211584 A1 | 9/2011 | Mahmoud | |
| 2011/0214060 A1 | 9/2011 | Imes et al. | |
| 2011/0224838 A1 | 9/2011 | Imes et al. | |
| 2011/0227704 A1 | 9/2011 | Padmanabhan et al. | |
| 2011/0231020 A1 | 9/2011 | Ramachandran et al. | |
| 2011/0246606 A1 | 10/2011 | Barbeau et al. | |
| 2011/0246898 A1 | 10/2011 | Imes et al. | |
| 2011/0251725 A1 | 10/2011 | Chan | |
| 2011/0257809 A1 | 10/2011 | Forbes, Jr. et al. | |
| 2011/0258022 A1 | 10/2011 | Forbes, Jr. et al. | |
| 2011/0264290 A1 | 10/2011 | Drew | |
| 2011/0264296 A1 | 10/2011 | Drake et al. | |
| 2011/0282497 A1 | 11/2011 | Josephson et al. | |
| 2011/0295393 A1 | 12/2011 | Lindahl | |
| 2011/0296169 A1 | 12/2011 | Palmer | |
| 2011/0302431 A1 | 12/2011 | Diab et al. | |
| 2011/0307101 A1 | 12/2011 | Imes et al. | |
| 2011/0316664 A1* | 12/2011 | Olcott et al. | 340/4.37 |
| 2012/0022709 A1 | 1/2012 | Taylor | |
| 2012/0036552 A1* | 2/2012 | Dare | H04L 41/0253 726/1 |
| 2012/0047011 A1* | 2/2012 | Rippetoe | G06Q 30/02 705/14.45 |
| 2012/0061480 A1 | 3/2012 | Deligiannis et al. | |
| 2012/0126020 A1 | 5/2012 | Filson et al. | |
| 2012/0169249 A1 | 7/2012 | Loveland et al. | |
| 2012/0179547 A1 | 7/2012 | Besore et al. | |
| 2012/0189140 A1 | 7/2012 | Hughes et al. | |
| 2012/0312874 A1 | 12/2012 | Jonsson | |
| 2013/0087629 A1 | 4/2013 | Stefanski et al. | |
| 2013/0099010 A1 | 4/2013 | Filson et al. | |

FOREIGN PATENT DOCUMENTS

| | | |
|---|---|---|
| JP | H0879840 A | 3/1996 |
| JP | 2006092035 A | 4/2006 |
| WO | 2002027639 A1 | 4/2002 |
| WO | 2007109557 A2 | 9/2007 |
| WO | 2008134460 A1 | 11/2008 |
| WO | 2009034720 A1 | 3/2009 |
| WO | 2009036764 A2 | 3/2009 |
| WO | 2009067251 A1 | 5/2009 |
| WO | 2009097400 A1 | 8/2009 |

OTHER PUBLICATIONS

Inncom International, Inc. "Installation User Manual", Revision 3.1, Sep. 12, 2006, pp. 1-36.
BAYweb Thermostat system.
Stigge, B. "Informed Home Energy Behavior: Developing a tool for homeowners to monitor, plan and learn about energy conservation," Massachusetts Insitute of Technology, 2001.
Mozer, M., et al. The Neurothermostat: Predictive Optimal Control of Residential Heating Systems. "Advances in Neural Information Processing Systems 9." MIT Press, 1997.
Inncom e529/X529 thermostat and logic board system.
Seligman, C., et al. Behavior Approaches to Residential Energy Conservation. "Saving Energy in the Home." Publishing Co., 1978. Ballinger.
"Wi-Fi", Wikipedia, printed Jul. 8, 2013.
Request Response, Wikipedia, printed Jul. 25, 2013.
Pering et al., Spontaneous Marriages of Mobile Devices and Interactive Space, Communication of the ACM, Sep. 2005, pp. 53-59.
Jaring et al., Improving Mobile Solution Workflows and Usability Using Near Field Communication Technology, 2007, Springer-Verlag Berlin Heidelberg, pp. 358-373.
Klym et al., The Evolution of RFID Networks: The Potential for Disruptive Innovation, Mar. 2006, MIT Communication Futures Program, pp. 1-20.
International Search Report, dated Aug. 1, 2013, 3 pages.
Canadian Office Action dated Apr. 19, 2017 in corresponding Canadian Patent Application No. 2,847,360.
European Office Action dated Jun. 20, 2017 in corresponding European Patent Application No. 12 772 560.4.
European Office Action dated Sep. 12, 2017 in corresponding European Patent Application No. 12 772 560.4.
Canadian Office Action dated Jan. 10, 2018 in corresponding Canadian Patent Application No. 2,847,360, 4 pages.
European Office Action dated Feb. 16, 2018 in corresponding European Patent Application No. 12 772 560.4, 9 pages.
Slavin: Alison Jane and Trundle, Stephen Scott, Remote Thermostat Control/Energy Monitoring, U.S. Appl. No. 61/179,224, filed May 18, 2009, 14 pages.
Gupta, Manu, A Persuasive GPS-Controlled Thermostat System, Royal Institute of Technology, Stockholm, Sweden, Jun. 2006; Pune Institute of Computer Technology, University of Pune, India, Jun. 2003 and Massachusetts Institute of Technology, Sep. 2008; 89 pages.
Gupta et al., "Adding GPS-Control to Traditional Thermostats: An Exploration of Potential Energy Savings and Design Challenges", Pervasive Computing, 7th International Conference, Pervasive 2009, Nara, Japan, May 11-14, 2009.
"A step-by-step guide to installing the 1st generation Nest Learning Thermostat," Article #1161, 2013 Nest Labs, pp. 1-6, http://http://support.nest.com/article/A-step-by-step-guide-to-installing-the-1st-generation-Nest-Learning-Thermostat, last accessed Feb. 1, 2013.
Peffer, T., et al. "A Tale of Two Houses: The Human Dimension of Demand Response Enabling Technology from a Case Study of an Adaptive Wireless Thermostat," ACEEE Summer Study on Energy Efficiency in Buildings, 2008.
BAYweb Thermostat system, Nov. 11, 2009.
Stigge, B. "Informed Home Energy Behavior: Developing a tool for homeowners to monitor, plan and learn about energy conversation," Massachusetts Institute of Technology, 2001.
Canadian Notice of Allowance dated Oct. 26, 2018 in Canadian Patent Application No. 2,847,360.

* cited by examiner

CUSTOMER ENGAGEMENT PLATFORM AND PORTAL HAVING MULTI-MEDIA CAPABILITIES

CROSS-REFERENCE TO RELATED APPLICATIONS

The present application claims priority to U.S. Provisional Patent Application Ser. No. 61/529,018, which was filed Aug. 30, 2011 and U.S. Provisional Patent Application Ser. No. 61/606,728, which was filed Mar. 5, 2012, the disclosures of which are hereby expressly incorporated by reference as though set forth fully herein.

FIELD OF THE DISCLOSURE

This disclosure relates to a customer engagement platform and portal for use within an energy management system.

BACKGROUND

Current energy management systems take a passive role to residential energy management. For example, consumers lack energy awareness and are typically left with having to evaluate a monthly bill to determine how much energy was consumed. Additionally, consumers lack transparency into what the leading causes of energy consumption are at their residences. Some utility companies are providing energy display only technologies that will allow consumers to see what the current price of energy may be. However, such displays take a passive role to conservation, and leaving it up to the consumer to manually curtail their use.

In certain regions, information infrastructure is lacking to enable utility companies and customers to access real-time energy consumption. For example, some regions have smart meters that are capable of measuring and reporting consumption data. However, there is a lack of communication and analytical infrastructure to allow utility companies to analyze future demand and schedule energy production. For example, some utilities are providing demand response systems that react to load levels, and force curtailment on residential, industrial, and commercial customers. Such programs have not been well received as they typically inconvenience the end user.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
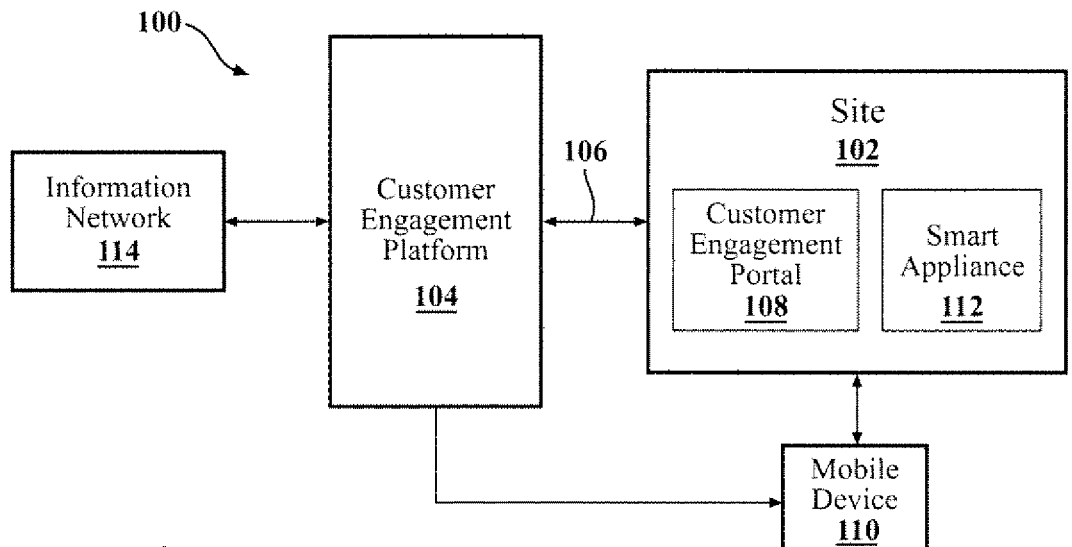
FIG. 1 illustrates a block diagram of an energy management system including a customer engagement platform according to an aspect of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bidirectional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. The communicative interaction between the network elements is not necessarily limited to only one specific form. A network element may be a node, a piece of hardware, software, firmware, middleware, another component of a computing system, or any combination thereof.

For purposes of this disclosure, an energy management system, network device, or any combination thereof can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an energy management system, network device, or any combination thereof can include any combination of a personal computer, a PDA, a consumer electronic device, a media device, a smart phone, a cellular or mobile phone, a smart utility meter, an advanced metering infrastructure, a smart energy device, an energy display device, a home automation controller, an energy hub, a smart energy gateway, a set-top box, a digital media subscriber system, a cable modem, a fiber optic enabled communications device, a media gateway, a home media management system, a network server or storage device, an energy substation, a vehicle charging station, a renewable energy production device, a renewable energy control device, an energy storage management system, a smart appliance, an HVAC system, a water pump, a heat pump, a hot water heater, a thermostat, an energy controller, an irrigation system, a lighting system, an alarm system, a smart power outlet, an energy detection device, a power measurement device, a power measurement unit (PMU), an air handler, a wireless air damper, a humidity control system, a heat and motion sensing device, a smart power outlet, a switch router, wireless router, or other network communication device, or any other suitable device or system, and can vary in size, shape, performance, functionality, and price.

According to an aspect, an energy management system can include memory, one or more processing resources or controllers such as a central processing unit (CPU) or hardware or software control logic. Additional components of the energy management system can include one or more storage devices, one or more wireless, wired or any combination thereof of communications ports to communicate with external devices as well as various input and output (I/O) devices, such as a keyboard, a mouse, pointers, controllers, and display devices. The energy management system can also include one or more buses operable to transmit communications between the various hardware components, and can communicate using wireline communication data buses, wireless network communication, or any combination thereof.

As used herein, a network can include various types and variants of wireless communication configurable to manage and establish communication at a site, including associated protocols or enhancements thereto including, but not limited to, any combination or portion of, IEEE 802.15-based wireless communication, Zigbee communication, INSETEON communication, X10 communication protocol, Z-Wave communication, Bluetooth communication, WIFI communication, IEEE 802.11-based communication, WiMAX communication, IEEE 802.16-based communication, various proprietary wireless communications, or any combination thereof.

As described herein, a flow charted technique, method, or algorithm may be described in a series of sequential actions. Unless expressly stated to the contrary, the sequence of the actions and the party performing the actions may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, system, or apparatus that comprises a list of features is not necessarily limited only to those features but may include other features not expressly listed or inherent to such process, method, article, system, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

FIG. 1 illustrates a block diagram of an energy management system, illustrated generally at 100, and configured to be used with a site 102 according to an aspect of the disclosure. Site can include a residential site, an industrial site, a manufacturing site, a commercial site, or any combination thereof. According to an aspect, energy management system 100 can include a customer engagement platform 104 located at a remote location that can be communicatively coupled to the site 102 via a network 106. According to a further aspect, site 102 can include a customer engagement portal 108, an associated mobile device 110, one or more smart appliances 112, or any combination thereof. In an aspect, the customer engagement portal 108 is configured to communicate with the customer engagement platform 104 and additionally functions as a controller of energy consumption at the site. In an aspect, the portal 108 can be incorporated into or be in the form of a wireless thermostat (TSTAT) running a DROID operating system to combine the functionality of the portal 108 and TSTAT into a single unit. Alternatively, as will be described in greater detail, the portal 108 is capable of being docked with the TSTAT and establishes communication with the TSTAT via communication interfaces disposed on each unit (and not expressly shown in FIG. 1). In other words, in an aspect, the portal 108 and the TSTAT are capable of communicating with one another via an interface. In either aspect, the customer engagement portal 108 is configured as a device for managing energy use at the site 102. According to a further aspect, the customer engagement platform 104 can communicate with an external information network 114 to receive and subsequently store a plurality of data files, including such items as audio files, video files, music files, weather forecasts, sports scores, informational or instructional videos, advertisements, current news or any other information received from a plurality of sources accessible to the information network 114. Additionally, the customer engagement platform 104 is configured to send the data files to the site 102 for management and display by the customer engagement portal 108. In another aspect, the customer engagement platform 104 and the mobile device 110 can both be configured such that the data files can also be sent from the platform 104 to the mobile device 110. Accordingly, the customer engagement platform 104 functions as an intermediate for the communication of data files between the information network 114 and the site 102 or mobile device 110. This aspect is advantageous because it allows for the controlled and selective communication of different types of information to users of the site 102, and also increases the ability to communicate with users of the site 102 beyond simply sending recommended set points for the TSTAT or other network devices or smart appliances 112 located at the site 102. As will be described in further detail, the customer engagement platform 104 is a host for a suite of different types of content received from the information network 114, which can ultimately be sent to the site 102 depending on the needs of the specific market. In other words, the customer engagement platform 104 provides an internet based server that is configured to facilitate the sending of data files to a targeted audience.

As previously mentioned, the mobile device 110 is configured to communicate with both the customer engagement platform 104 and the site 102. In an aspect, the mobile device 110 can communicate with the customer engagement platform 104 and the site 102 using a WIFI or 802.11 based communication, Bluetooth communication, Zigbee communication, or various other wireless communications, or any combination thereof. According to a further aspect, mobile device 110 can communication with the customer engagement platform 104 or the site 110 using a subscriber based wireless data communication network such as a 3G network, 4G network, EDGE network, a cellular network, WiMAX, other wireless data communication, or any combination thereof. According to a further aspect, mobile device 110 and the customer engagement platform 104 are configured to communicate using XMPP PubSub protocol. See the definition of the XMPP PubSub protocol at http://xmpp.org, the entirety of which is hereby incorporated by reference.

According to a further aspect, the ability of the customer engagement platform 104 to establish communication with both the site 102 and the mobile device 110 is advantageous because it allows the customer engagement platform 104 to gather information about both the mobile device 110 and the portal 108 associated with the site 102. For example, the customer engagement platform 104 is configured to receive from the portal 108 the type of smart appliances 112 disposed at the site 102 along with any energy consuming information of either the smart appliances 112 or the site 102. This information ultimately allows the data files to be paired with the site 102 in response to the received information and helps in establishing a targeted audience for the data files. For example, information directed to the site 102 can be focused on how to properly operate the smart appliance 112 disposed at the site 102 or can include instructional videos on how to operate a new network device recently detected at the site 102. In addition, the ability of the customer engagement platform 104 to communicate with the mobile device 110 allows the customer engagement platform 104 to identify where a user associated with the mobile device 110 is located. Accordingly, the customer engagement platform 104 allows one or more third parties access to the information network 114 to request the sending of advertisements or information to the mobile device 110 according to a detected location of the mobile device 110. For example, advertisements or information can be sent to the mobile device 110 when the mobile device 110 is located within a predetermined vicinity of the third party's business. In addition, the ability of the customer engagement platform 104 to detect the location of the mobile device also allows the customer engagement platform 104 to track the travel patterns of the user associated with the mobile device 110. In addition, the customer engagement platform 104 is configured to determine whether a user is located at the site 102, along with determining how often a user is located at the site 102 during a normal day. Accordingly, in an aspect, data files can be sent to the mobile device 110 or site 102 based on these detected travel patterns of the user or based on this characterization. In each of these situations, the relevance of the data files paired with the user or site 102 is improved and ultimately leads to increased interest in program participation by both third parties and the user because the data files being sent are focused and pertinent to the specific user or site 102.

In another aspect, the customer engagement platform 104 is configured to receive the detected preferences of the site 102 from the portal 108. These detected preferences could include how often a user engages the portal 108, the number and type of smart appliances 112 located at the site 102, as well as what profiles are programmed for the smart appliances 112, when applicable. In an aspect, the customer engagement platform 104 and the portal 108 are also configured to communicate and receive these preferences via the XMPP PubSub protocol. For example, the customer engagement platform 104 can detect whether a user of the site 102 keeps the site warmer or cooler during both the winter and summer months, along with providing visibility into the user's focused efforts on energy efficiency and curtailing energy use at the site. Also, in another aspect, depending on the amount of detected activity along with visibility into certain profiles utilized with the smart appliances 112, the user of the site 102 can be characterized as an active user, normal user, or an inactive user. In an aspect, the data files received from the information network 114 can be reviewed and correspondingly categorized as targeted for active users, normal users or inactive users. After this categorization, the data files and users are paired based on their respective designations, and the data files can subsequently be sent by the platform 104 to the associated user. The customer engagement platform 104 is advantageous because all of the received information from the mobile device 110 and the site 102 can be considered by the platform 104 prior to sending the data files to the portal 108 or mobile device 110. In other words, all of the information gathered by the portal 108 can be used by the customer engagement platform 104 to tailor the type of data files which are communicated to the site 102. This feature keeps a user from receiving unwanted information and leads to better results for the information network 114.

Figure 1B:
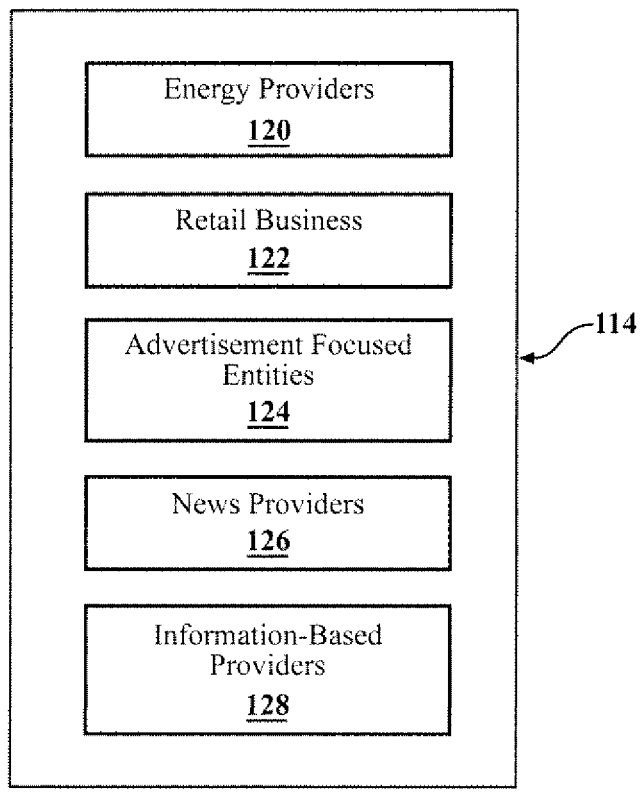
FIG. 1B illustrates a block diagram of the information network according to an aspect of the disclosure.

As previously mentioned, the customer engagement platform 104 can facilitate the sending of data files including advertisements or other information from the information network 114 to the mobile device 110 or the customer engagement portal 108 at the site 102. FIG. 1B illustrates a block diagram of a plurality of third parties who can potentially be in communication with the information network 114, however this list is not all inclusive. As previously mentioned, based on the variety of the third parties, the customer engagement platform 104 is configured to satisfy a host of different customers because each third party will have a different reason for utilizing the customer engagement platform 104 to engage the user at the site 102. Accordingly, the customer engagement platform 104 is configured to customize and pair the data files according to at least one of the previously mentioned aspects prior to sending the data file to the user of the site 102. In other words, the customer engagement platform 104 is configured to understand the desire or objective of each individual third party and correspondingly send data files according to information received from the portal 108 or mobile device 110 to establish a targeted audience for the data files. Therefore, as was previously mentioned, the ability of the customer engagement platform 104 to communicate with both the mobile device 110 and the site 102 and correspondingly receive information associated with the mobile device 110 and site 102 facilitates this selective communication of data files.

In an aspect, the information network 114 can include a plurality of energy providers 120 such as a utility company, a COOP, a retail energy provider, or various other energy providers, or any combination thereof. In another aspect, the information network 114 can include a plurality of retail businesses 122 such as privately owned, publicly owned and non-profit retail businesses, or any combination thereof. In another aspect, the information network 114 can include a plurality of advertisement focused entities 124 such as Groupon®, Daily Deal®, Yelp®, or any combination thereof. In another aspect, the information network 114 can include a plurality of news providers 126 such as entities who provide local news, sports scores, weather updates, or any combination thereof. In another aspect, the information network can include a plurality of information-based providers 128 such as entities who provide energy alerts, energy pricing, tutorials related to smart appliances, or any combination thereof.

In an aspect, the customer engagement platform 104 is configured to categorize the data files received from the information network 114 as either customer-based data files or functional-based data files prior to sending them to the site 102. Customer-based data files can include advertisements specific to each of the energy providers 120, retail businesses 122 or advertisement focused entities 124. In an aspect, the customer-based advertisements can include the presentation of a web link on a TSTAT touch-screen display which allows the user to touch the ad and automatically be linked to the retail business to facilitate the purchase of the corresponding product or service. In an alternative aspect, the customer-based advertisement can allow a user to touch the ad and automatically be linked to the retail business by phone to initiate a discussion with regard to the purchase of the product or the scheduling of a service. The ability to automatically link the user with the retail businesses or energy providers through the TSTAT facilitates impulse buying at the site. In another aspect, the customer based advertising can be presented in the form of a banner advertisement.

In another aspect, functional-based advertisements or information can include data files received from the news providers 126, and the information-based providers 128, or any combination thereof. As previously mentioned, the functional-based advertisements can include tutorials directed to managing energy use at a site, tutorials directed to instructional use of a specific smart appliance located at the site 102, tutorials directed to instructional use of the portal/TSTAT 108, energy advisor alerts such as informing the user of an ozone action day or that energy pricing is increasing and correspondingly recommending a change of set-points at the TSTAT, and local weather forecasts, or any combination thereof. As previously mentioned, the data files transferred from the customer engagement platform 104 can be in the form of video files for display on the portal 108, mobile device 110 or TSTAT. Accordingly, the local forecasts, advertisements, energy alerts, etc can be short 5-30 second videos that can be periodically played on the portal 108, TSTAT or mobile device 110.

In another aspect, the customer engagement platform 104 is able to detect if the advertisement or information was consumed on the mobile device 110, the portal 108 or the TSTAT. If the advertisement or information was consumed, the customer engagement platform 104 is configured to prevent the sending of the same advertisement or information to the user a second time. In another aspect, since the customer engagement platform 104 is in communication with the mobile device 110 and the portal 108, the customer engagement platform 104 is configured to communicate advertisements and information based on the size and resolution associated with the displays of the mobile device 110 and/or portal 108 on which the information is to be presented. For example, the display of the mobile device 110 will have different criteria depending on what type of phone it is, i.e. iPhone®, Droid®, etc. Accordingly, the customer engagement platform 104 can configure the data file to a format which can be properly be presented on the targeted display.

Figure 2:
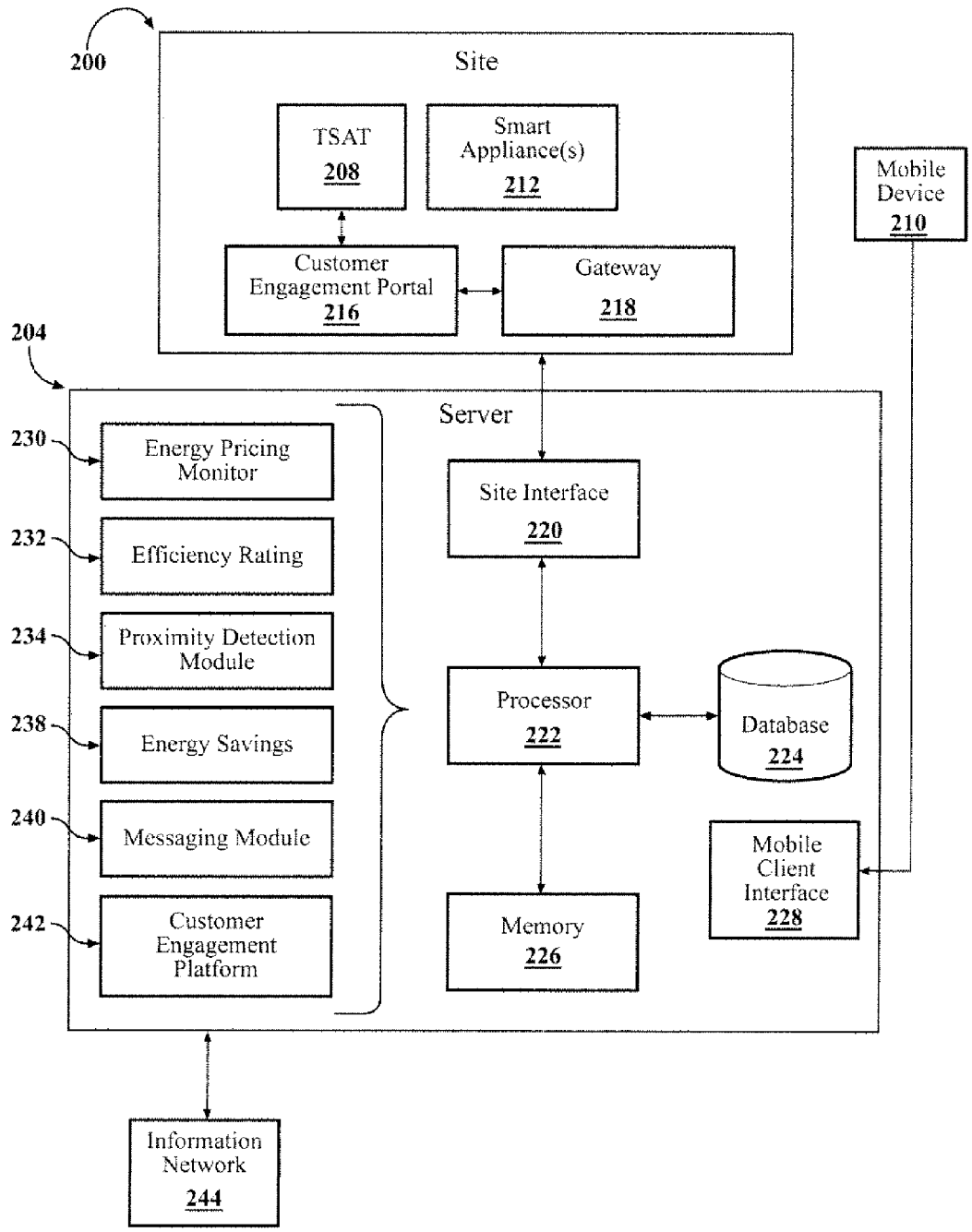
FIG. 2 illustrates a block diagram of a server incorporating the customer engagement platform according to an aspect of the disclosure.

FIG. 2 illustrates a block diagram of a server 204 of the energy management system 200 according to an aspect of the disclosure. As shown in the FIG. 2, the server 204 incorporates the customer engagement platform 242 for facilating the communication of information between the information network 244 and the site 202. According to an aspect, the server 204 is located at a remote location and is communicatively coupled to a network 206 for establishing communication with the site 202. As discussed in conjunction with FIG. 1, the site 202 can include a customer engagement portal 216 capable of connecting with or being integral to a wireless thermostat (TSTAT) 208. The customer engagement portal 216 is also capable of connecting with an associated mobile device 210, one or more smart appliances 212, or any combination thereof. In an aspect, the customer engagement portal 216 is capable of communicating with the mobile device 210, the smart appliances 212, or any combination thereof via XMPP PubSub protocol. In an aspect, the customer engagement portal 216 functions as a controller for managing energy use of the site and can be configured to establish a wireless network 246 using a wireless communication described herein. Various combinations of networks and variants thereof can also be deployed by customer engagement portal 216 to establish the wireless network 246.

According to a further aspect, the server 204 can also include a processor 222 that can be configured as multiple processors having one or more processing cores as needed or desired, one or more databases 224 that can be internal or external to server 204, and memory 226 configurable to store the previously mentioned data files after receipt from the information network 244. According to an aspect, server 204 can be located in a single location, however it also can be located in multiple locations, and the server 204 can have certain configurations including cloud computing, distributed computing, dedicated computing, or any combination thereof can be deployed. According to an aspect, customer engagement portal 216 can include portions or all of server 204 and can deploy some or all of the capabilities of server 204. As will be discussed in greater detail, the processor 222 and memory 226 facilitate the operation of the customer engagement platform 242, along with other modules disposed on the server 202.

According to another aspect, server 204 can include a site interface 220 operable to be coupled to network 206 and gateway 218 to communicate the data files between site 202 and server 204. Accordingly, data files such as the informational or instructional videos or other videos of current weather forecasts, advertisements, informational videos, audio files, sports scores or any other information can be communicated from the server 204 through the network 206 and gateway 218 for receipt by the customer engagement portal 216, thermostat 208 or mobile device 210. Server 204 can also include a mobile client interface 228 that can be coupled to a wireless telecommunications communication gateway such as a WAP gateway and the like. According to an aspect, mobile client interface 228 can communicate with one or more mobile devices 210, using information network 244 or another data network provided by a wireless telecommunications provider. Mobile client interface 228, mobile device 210, an information network 248, or various combinations thereof can include secure connection capabilities such as SSL connections or other carrier supported secure connection capabilities. In addition to the customer engagement platform 242, the server 204 can also include an energy price monitor 230, an efficiency rating module 232, a proximity detection module 234, a energy savings module 238, a messaging module 240, or any combination thereof.

According to an aspect, energy pricing monitor 230 can be deployed by processor 222 and can access EMI stored within database 224 or a remote data source to monitor energy pricing of site 202.

According to an aspect, efficiency rating module 232 can be deployed by processor 222 and can access EMI stored within database 224 or a remote data source to determine an efficiency rating, thermal response, virtual capacity capabilities, performance data, or various other of site 202.

According to an aspect, proximity detection module 234 can be deployed by processor 222 and can access EMI stored within database 224 or a remote data source to detect a location of mobile device 210 relative to site 202, and possibly pair data files with a site 202 based on a proximity of mobile device 210 to site 202 or alternatively a GPS location of the mobile device 210 or alternatively detected travel patterns of the mobile device 210.

According to an aspect, energy savings module 238 can be deployed by processor 222 and can access EMI stored within database 224 or a remote data source to determine a past or forecasted energy savings of site 202. In a form, server 204 can include user account login information at a utility company or energy provider that can enable a user to gain access to meter data. As such, energy savings module 238 can pull EMI data stored at a third party website, and output past or forecasted energy savings of site 202, along with associated data files including videos disclosing the same. For example, energy management information (EMI) can include any combination of data sources such as real-time congestion data, energy transmission line operating conditions, syncrophasor data, firm owned alternative energy generator operating status, non-firm owned alternative energy generator operating status, locational marginal pricing data, congestion revenue rights data, energy storage capacity, stored energy output capacity, real time energy pricing data, historical energy pricing data, real time nodal demand data, historical nodal demand data, real time zonal demand data, historical zonal demand data, external market demand data, historical external market demand data, nodal price data, real time energy price data, real time energy demand data, historical energy demand data, historical energy price data, firm owned alternative energy generator data, non-firm owned alternative energy generator data, est. firm owned alternative energy generator output schedule, estimated non-firm owned alternative energy generator output schedule, macro environmental data, micro environmental data, real-time grid congestion data, historical grid congestion data, renewable energy credit information, carbon credit cap and trade pricing information, fixed and variable costs for operating alternative energy generators, production tax credit (PTC) pricing information, investment tax credit (ITC) information, federal grant information, credit-to-grant comparison analysis data, PTC to ITC analysis data, interest/finance data for alternative energy generators, asset depreciation schedules, available solar and wind output capacity, distributed energy production scheduling data, feed-in tariff data, baseline energy generator data, load utilization data, transmission efficiency data, congestion right revenue data, priority dispatch data, federal renewable portfolio standard (RPS) data, state renewable portfolio standard (RPS) data, net-metering data, current or forecasted % coal production data, current or forecasted % natural gas production data, current or forecasted % green house gas production data, current or future coal pricing data, current or future natural gas pricing data, current or future oil pricing data, current or future energy transmission pricing data, forecasted transmission price setting events, virtual capacity data, historical site performance data, seasonal weather and performance data, aggregate scheduling demand data, collaborative demand response data, historical device consumption data, forecasted device consumption data, or any combination thereof.

According to an aspect, messaging module 240 can be deployed by processor 222 and can access EMI stored within database 224 or a remote data source to initiate communication of messages or data files to the proper site 202. For example, messaging module 240 can use an email address, mobile device identifier, SMS gateway data, network device identifier data, IP address of portal 216, IP address of gateway 218, IP address of AMI gateway 242, or any combination thereof to communicate messages, the data files, advertisements or any other energy management information. The messaging module 240 in conjunction with the customer engagement platform 242 helps facilitate the pairing of data files with the most relevant site location to establish a targeted audience for the transfer of the data files.

According to a further aspect, energy management system 200 and customer engagement portal 216 can access consumption data at site 202. For example, customer engagement portal 216 can include a wireless communication module (not expressly illustrated in FIG. 2) such as a Zigbee communication module (e.g. 802.15.4), WIFI module, Bluetooth module or various other wireless modules, or any combination thereof. Customer engagement portal 216 can include one or more profiles stored within a memory device (not expressly illustrated in FIG. 2) configured to include data that will enable controller 216 to join an AMI gateway (not expressly illustrated in FIG. 2). For example, a profile can include various attributes to initiate or establish communication using one or more security levels as needed or desired.

According to a further aspect, mobile device 210 can include a mobile device application that can upload location data to server 204, customer engagement portal 216, TSTAT 208, smart appliances 212, various other devices capable of receiving location data, or any combination thereof. For example, in a particular form, mobile device 210 can report a current location using a location application program interface (API) of mobile device 210, and can upload location data to server 204 using mobile client interface 228. Server 204 can then deploy proximity detection module 234 to determine whether one or more data files should be sent to the site 202 or the mobile device 210. For example, proximity detection module 234 can include rules based logic to determine if data files should be sent to the site 202 of the mobile device 210. For example, if a user is within two miles of site 202, and is moving towards the site 202, server 204 can initiate sending a particular data file to the site 202. For example, data files including recent news, weather forecasts, sports scores, all updated in real-time, can be sent to the site 202 for display at the customer engagement portal 216 or the thermostat 208 upon the user's arrival to the site 202. This is advantageous because it allows for selective communication of information from the server 204 to the site 202, and increases and improves the communication and amount of information received by a user of the site 202. The same rules based logic can be applied based on a user's location to a third party's business. Accordingly, advertisements associated with a third party business can be sent to the mobile device when a mobile device is within a predetermined zone of the business.

According to another aspect, as previously discussed, the server 204 can categorize the site 202 in response to received operating characteristics and performance data of site 202 and associated energy consuming devices at site 202. For example, server 204 can use efficiency rating module 232 to monitor energy performance data at site 202. Performance data can include measured performance data detected by customer engagement portal 216, performance specifications of an energy consuming device that can be based on a model number or other identification data of the device, the size or square footage of site 202, efficiency improvements or specifications of site 202, various other EMI data, or any combination thereof. As performance of an energy consuming device may be detected, a particular set of data files can be paired with the site and sent using customer engagement platform 242 and messaging module 240. In other words, the received performance data and operating characteristics of the site can lead to a targeted audience for the data files. For example, the video files communicated to the site can include information directed to operating a thermostat properly or instructional videos on how to operate a new network device recently detected at the site 202. This is advantageous because the data files sent to the site are paired and tailored to specific characteristics of the site 202. Also, as previously discussed in connection with the customer engagement platform 242, one or more third parties may subscribe to a service and be included in the information network 244 for sending advertising or information to the site 202 which is specific to that third party and is based on a detected user preference or performance or use of a specific network device at the site 202. For example, if the platform 242 detects that the performance of an energy consuming device is eroding, data files can be sent to the portal 216 which include advertisements for local repair service companies. Also, when advertisements are sent to the site 202 based on user preferences or characteristics of the site 202, the relevancy of the advertisement is improved and potentially leads to increased interest in participation both by third parties and the user.

As previously discussed, server 204 can use energy pricing monitor 230 to generate the sending of the data file from the customer engagement platform 242. For example, energy pricing monitor 230 can be configured to detect energy pricing within an energy market, and initiate transfer of the data file to the site 202 such as to the customer engagement portal 216 or TSTAT 208, other network devices at site 202, or any combination thereof. For example, energy pricing monitor 230 can output a data file in response to an unfavorable pricing condition, and further upon the detection of a travel direction and a distance between mobile device 210 and site 202. In another form, customer engagement platform 242 can also initiate transfer of the data file to the site 202 in response to a favorable pricing condition, and a detection of a travel direction and a distance between mobile device 210 and site 202. For example, the data file could include a news report or other informational video informing a user about a current price condition or a change in the current price of energy. In this manner, a user's travel direction, distance, and current energy pricing within a market can be used to determine what data files are transferred to the site 202 from the customer engagement platform 242.

As previously discussed, server 204 can use proximity detection module 234 to detect a distance mobile device 210 may be from site 202 including a residential site. For example, proximity detection module 234 can access location data stored within database 224 and provided by mobile device 210 using mobile client interface 228. Proximity detection module 234 can further detect mobile device 210 within a first zone (e.g. less than one (1) mile from the site, less than three (3) miles from site, greater than five (5) miles from site, etc.). Proximity detection module 234 can further detect a current thermostat setting of TSTAT 208, and an indoor temperature detected at site 202. Proximity detection module 234 can then determine when the customer engagement platform 242 should initiate the transfer of data files based on a location of the mobile device 210. As such, data files transferred to the site 202 can be managed based on a user's proximity to a site, which zone a user may be located in, and current settings of network devices used at a site 202. Accordingly, the data files are paired to a site based on a user's proximity and energy preferences.

In an aspect, customer engagement platform 242 can be utilized in conjunction with a commercial setting such as a hotel. In this aspect, upon check-in at the hotel, a guest's mobile device is synchronized with the guest's hotel room. In an aspect, the guest can also enter climate preferences for their hotel room and these preferences can be loaded on the customer engagement portal 216 associated with the hotel room. In an aspect, if the guest is a frequent visitor of a chain of hotels, the guest can set-up a profile which includes preferred climate preferences which can be pre-loaded on a customer engagement portal 216 prior to arrival. In either situation, when the mobile device of the guest is detected on the premises of the hotel property or within a first zone of the hotel, the customer engagement portal 216 sets the thermostat in the guest's room to the guest's preferred climate preference. However, when a guest travels out of the first zone and into a second zone, the guest's preferred climate setting can be automatically adjusted to save energy in the hotel room. This can occur because since the mobile device is detected at a predetermined distance away from the hotel, the hotel is aware that the guest is not located at the property and will not be returning in a short period of time based on being disposed a predetermined distance from the hotel, e.g. in the second zone. This is advantageous because in a normal situation, a guest arrives at their hotel room and sets the thermostat to a certain temperature which normally remains at that set-point until the guest checks out of the property. Accordingly, through the utilization of the customer engagement portal 216 and platform 242, the hotel is able to control the climate in each of the hotel rooms independently and without guest intervention, and thus is able to decrease energy costs.

In another aspect, a customer engagement portal 216 can be disposed in each hotel room of the hotel to improve the hotel experiences of a guest. In an aspect, the customer engagement platform 242 can communicate data files to the customer engagement portal 216 associated with local restaurants, bars or other entertainment providers such as movies, theme parks, etc. that are situated within an area surrounding the hotel. In another aspect, local weather and news reports along with maps associated with the area can also be communicated to the portal 216 to provide local information to the guest. In another aspect, the guest can establish a guest profile which includes their preferred entertainment activities and food preferences, and can receive data files sent from the customer engagement platform 242 to the customer engagement portal 216 paired with these preferences.

According to a further aspect, a user or site profile can be used to enable use of data files sent from the customer engagement platform 242. For example, a site manager or user can establish a profile setting to enable or disable the ability to receive the data files at the customer engagement portal 216 or TSTAT 208 located at the site 202. In addition, the profile setting can establish certain parameters, such as size and resolution, required for the data files to ensure they are capable of being displayed on the customer engagement portal 216 or mobile device 210. As such, customer engagement portal 216 can access a profile setting prior to connecting to server 204, enabling controlled or selective receipt of a data file from the customer engagement platform 242, or any combination thereof. In other forms, customer engagement portal 216 can access server 204 to detect profile settings. Accordingly, the profile setting allows a user to selectively choose what information is received at the site, therefore preventing a user from receiving unwanted information, video files of other data files at the site.

According to another aspect, customer engagement portal 216 is configured with a WIFI communication device and thus can enable a connection to a home computer system, laptop computer, Netbook, home server, IPAD®, home automation system, router, or other WIFI enabled system or devices (not expressly illustrated in FIG. 2), or any combination thereof. Accordingly, the customer engagement portal 216 can also receive additional data files, such as other video files or music files, from other devices for use by the customer engagement portal 216 or TSTAT 208. For example, as will be discussed in greater detail, the customer engagement portal 216 or thermostat 208 is configured such that it can receive and play videos stored on other devices within the network or can receive music files from a device such as a home computer or iPOD® for playing music on speakers of the thermostat 208 or customer engagement portal 216. This is advantageous because the portal 216 or thermostat 208 can then have the capability to be a multimedia unit, and effectively expands an entertainment system of the site.

According to another aspect, customer engagement portal 216 can detect when mobile device 210 connects to WIFI network 244 and initiate or stop use of the data file at any device coupled to wireless network 246. For example, as mobile device 210 connects to WIFI network 248, customer engagement portal 216 can initiate use of the data file, such as initiating display of a video, weather forecast, sports scores, etc. on a display of the customer engagement portal 216 or TSTAT 208. Alternatively, as mobile device 210 moves or transitions away from site 202, customer engagement portal 216 can detect a signal loss and stop use of the data file at the device. According to an aspect, customer engagement portal 216 can include specific data files for initiating or stopping use of the data file upon detecting a signal loss. In other forms, customer engagement portal 216 can report the signal loss to server 204 which can then determine a data file to be transferred to the site (if any) in response to a reporting of the WIFI signal being lost.

Figure 3:
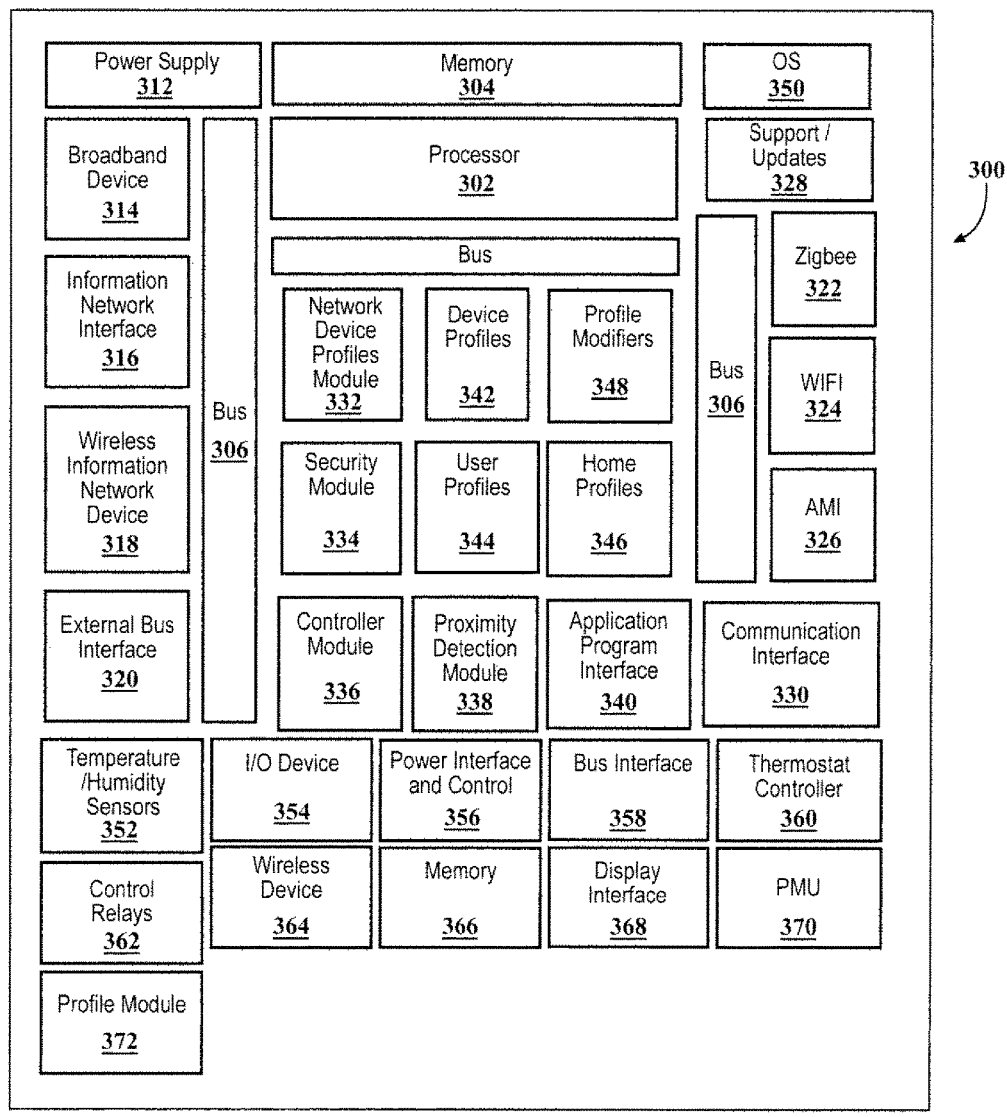
FIG. 3 illustrates a block diagram of a customer engagement portal according to an aspect of the disclosure.

FIG. 3 illustrates a block diagram of an energy management apparatus, illustrated generally as a customer engagement portal 300, or alternatively referred to as a controller, according to an aspect of the disclosure. The customer engagement portal 300 can include a processor 302 and memory 304 configurable to store data. Memory 304 can be configured as on-board memory of processor 302, or in other forms can also include expandable memory such as DDR memory, Flash Memory, EPROM, ROM, or various other forms, or any combination thereof generally illustrated as memory 304. As previously disclosed, the customer engagement portal is configured to communicate with the customer engagement platform (not expressly shown in FIG. 3).

According to an aspect, customer engagement portal 300 can include buses 306, 308, 310 configured to couple data and signals to various components within portal 300. Although illustrated as multiple buses 306, 308, 310, customer engagement portal 300 can include a single bus, multiple buses, or any combination thereof. Various types of bus configurations can be used as needed or desired including, but not limited to, any combination or portion of a serial bus, a parallel bus, a serial—parallel bus, a universal serial bus, industry standard bus, controller area network bus, a serial peripheral bus, a universal asynchronous receiver transmitter bus, a control bus, standard digital input output bus, or any combination thereof.

According to an aspect, customer engagement portal 300 can also include a communication interface 330, an information network interface 316, an external bus interface 320, an application program interface 340, or any combination thereof configurable to be coupled to one or more of buses 306, 308, 310 or any combination thereof. According to an aspect, any combination of interfaces 330, 316, 320, 340 can be configured in any combination of hardware, software, or firmware, and can include any combination or portion of a serial bus interface, a parallel bus interface, a serial—parallel bus interface, a universal serial bus interface, industry standard bus interface, controller area network bus interface, a serial peripheral interface, a universal asynchronous receiver transmitter interface, a control bus interface, standard digital input output interface, or any combination thereof.

According to a further aspect, customer engagement portal 300 can also include a power supply 312 capable of providing power to portal 300. Power supply 312 can be an internal power supply and in other forms can be provided external to customer engagement portal 300. Customer engagement portal 300 can also include a broadband device 314 configured to be coupled to a broadband network. For example, broadband device can include an Ethernet communication module, a Cable or coaxial-based communication module, and can include communication logic to receive and transmit data between portal 300 and an information network such as a LAN, WAN, local network, the Internet, and the like. Broadband device 314 can include TCP/IP communication capabilities and can also be security enabled to transmit SSL data between portal 300 and an information network.

According to a further aspect, customer engagement portal 300 can also include an information network interface 316, a wireless information network device 318, and an external bus interface 320. Customer engagement portal 300 can also include a Zigbee enabled communication device 322, a WIFI device 324, an Advanced Metering Infrastructure device 326, a support and updates module 328, and a communication interface 330. Customer engagement portal 300 can also include an operating system 350 that can be executed by processor 302.

According to an aspect, customer engagement portal 300 can be configured to use any type or combination of wireline or wireless communication to manage energy use at a site, including, but not limited to, power-line communication, wire line communication, wireless communication, Zigbee based communication, INSETEON based communication, X10 based communication, Z-Wave based communication, WiMAX based communication, Bluetooth based communication, WIFI based communication, 802.11-based communication, 802.15-based communication, 802.16-based communication, proprietary communication, other communications described herein, or any combination thereof.

According to a further aspect, customer engagement portal 300 can include a network device profile module 332, a security module 334, a controller module 336, and a proximity detection module 338. Customer engagement portal 300 can also include device profiles 342, user profiles 344, home profiles 346, and profile modifiers 348. One or more of the modules, profiles, or any combination thereof can be provided as encoded logic such as a ROM, PROM, EPROM, EEPROM, or various combinations thereof and accessible to processor 302 as needed or desired. In other forms, one or more of the modules, profiles, or any combination thereof can be stored within a memory device such as memory 304, within a removable flash drive (not expressly illustrated in FIG. 3), an external data storage device (not expressly illustrated in FIG. 3), or any combination thereof.

According to a further aspect, customer engagement portal 300 can include processor 302 operable to manage energy use at a site. For example, as will be discussed in greater detail, a thermostat can be incorporated into the customer engagement portal 300 to control a HVAC unit disposed at the site. In addition, processor 302 can be configured to convert an incoming message received from a wireless energy network (not expressly illustrated in FIG. 3) into XML enabled output data. Processor 300 can also format an outgoing message to be output to a wireless energy network using XML enabled input data. According to an aspect, XML enabled input data includes a network device identifier of a network device accessible using a wireless energy network. Customer engagement portal 300 can also include communication interface 330 configurable to enable access to communication device, such as Zigbee device 322, WIFI device 324, AMI device 326, or any other device accessible to portal 300 and having access to a wireless energy network.

According to another aspect, customer engagement portal 300 can include a wireless data module, such as Zigbee device 322, WIFI device 324, AMI device 326, or any other device accessible to customer engagement portal 300 and having access to a wireless energy network. A wireless data module can be accessible to processor 302 and configured to generate profile data to be used with an outgoing message. For example, processor 302 can access network device profile module 334 and use a network device profile of a network device accessible to the wireless energy network to output a message receivable by a specific network device. Network device data can be formatted using a network device profile of a specific network type of the wireless energy network. In some forms, a network device profile may not include information sufficient to output network device data. As such, profile modifiers 348 can be provided and can include profile modification data of the network device not available within the network device profiles 342 that can be used to communicate with a network device coupled to an energy network accessible to customer engagement portal 300.

For example, device profiles 342 can include a Zigbee thermostat device profile having home automation profile data and smart energy profile data. In the situations where the thermostat is not incorporated into the customer engagement portal 300, profile modification data 348 can be used to access additional profile information to format an outgoing Zigbee message and access a Zigbee enabled thermostat coupled to a wireless energy network accessible to controller 300. In this manner, additional features and functionality that may not exist within Zigbee profile standards can be accessed by using profile modifier data 348. As such, functionality of a Zigbee enabled device can be expanded beyond a standard Zigbee profile.

According to another aspect, customer engagement portal 300 can include a first user profile stored within user profiles 344 and accessible to processor 302. For example, a first user profile can include a first time schedule to operate a network device and a control setting to control the network device. User profiles 344 can also include a first user identifier to identify a first user and can also be include a network device identifier to identify the network device to control or alter.

According to another aspect, customer engagement portal 300 can include a second user profile within user profiles 344 and accessible to processor 302 that is different than the first user profile. A second user profile can include a second time schedule to operate a network device and at least one control setting to control the network device. The second user profile can also include a second user identifier to identify the second user and a network device identifier to identify the network device.

According to a further aspect, processor 302 can be used to detect an input to a network device as a user schedule is being used, and store a new setting of the network device in association with the deployed user schedule. For example, processor 302 can detect a current user profile being used, and further detect an interaction with a network device during use of a first user schedule. Upon detecting an interaction, processor 302 can initiate an update to the first user profile in response to detecting the interaction. In addition, the amount of interaction a user has with the network device can be tracked for future utilization by the customer engagement platform when pairing data files with the site.

According to a further aspect, customer engagement portal 300 can be configured as a server and can deploy several processes of applications that can be used, including, but not limited to Ubuntu Version 9.04, Java SE Version 6, "lighttpd HTTP Server", Servlets, FastCGI, Apache log4j, Eclipse, Apache Ant, or any equivalent operating environments or software, or any combination thereof.

According to an aspect, customer engagement portal 300 can use communication interface 330 and API 340 to enable access to ZigBee device 322 operably coupled to bus 308 and accessible to API 340. As such API 340 can be used by processor 302 during use of one or more modules to access Zigbee device 322, WIFI device 324, AMI device, 326 or any combination thereof to communicate network data using a wireless energy network. As such, processor 302 can make API calls to API 340 to access various functions of one or more communication devices 322, 324, 326.

According to another aspect, customer engagement portal 300, can be used to coordinate a wireless energy network, and use data within the wireless energy network that was received from an external information source, such as the customer engagement platform, accessible to the portal 300. For example, broadband device 314 can be coupled to an information network via the customer engagement platform. Broadband device 314 can further be coupled to information network interface 316 operable to access external data sources that can be communicatively coupled to broadband device 314.

According to a further aspect, customer engagement portal 300 can be configured to access a wireless energy network at more than one security level. For example, processor 302 can use security module 334 configured to initiate supporting coordinating a wireless energy network at a first security level and enable access to a network device at a first security level. For example, processor 302 can initiate receipt of an incoming message using Zigbee device 322 at the first security level. Upon gaining access and communicating device data, processor 302 can disconnect the network device. In another form, security module 334 and processor 302 can then initiate access to a second network device at a second security level using Zigbee device 322, and enable access to the second network device using the second security level. Processor 302 can initiate receipt of a second incoming message at the second security level, and upon receipt of device data disable access to the second network device. As such, customer engagement portal 300 can use a single Zigbee device 322 to access multiple network devices using more than one security level.

According to an aspect, customer engagement portal 300 can be used to access more than one wireless energy network. For example, processor 302 can initiate using a first wireless communication device, such as Zigbee device 322, to coordinate a first wireless energy network. Processor 302 can also initiate using a second wireless communication device, such as a second Zigbee device (not expressly illustrated in FIG. 3), or other wireless device, to coordinate a second wireless energy network. As such, processor 302 can access one or more network devices coupled to one or more wireless energy networks. According to another aspect, a second Zigbee device, or other wireless device can be used to join a second wireless energy network instead of coordinating the second wireless energy network. For example, the second wireless energy network can include an advanced metering infrastructure (AMI) enabled network operably associated with an AMI enabled smart meter. AMI device 326 can include a second ZigBee device, or other wireless communication device, capable of joining an AMI enabled network of an AMI enabled smart meter (not expressly illustrated in FIG. 3). As such, smart meter data can be accessed by controller 300 as needed or desired. For example, AMI data or smart meter data can be obtained on a periodic basis and communicated in association with a site report having network device data. As such, broadband device 314, wireless information network device 318, or other information network devices can be used to site report data that can include AMI data acquired using customer engagement portal 300.

According to another aspect, customer engagement portal 300 can use AMI device 326 to access an AMI enabled smart meter to alter an operating condition of a network device accessible to controller 300 using Zigbee device 322. For example, AMI device 326 can include an advanced metering infrastructure (AMI) enabled interface capable of initiating access to an AMI enabled smart meter. Portal 300 can use AMI device 326 to receive AMI data from an AMI enabled smart meter. Processor 302 can be used to initiate altering an operating condition of a network device in response to detecting AMI data received from the AMI enabled smart meter. Processor 302 can further be used to detect a smart energy control request output by an AMI enabled smart meter, and initiate using the smart energy control request at the network device.

According to another aspect, customer engagement portal 300 can be used to access an information network outside of the wireless home energy network, such as the customer engagement platform (not expressly shown in FIG. 3) or the information network (not expressly shown in FIG. 3). Also, information network interface 316 can be configured to access an information network using broadband device 314, wireless information network device 318, external bus interface 320, or any combination thereof. According to an aspect, wireless information network device 318 can include a subscriber based network device, or in other forms can include a WIFI network access device, or various combinations thereof. According to an aspect, wireless information network device 318 can include WIFI device 324 that can be used to access an information network. As such, WIFI device 324 can be used to access an information network, a wireless energy network, a local wireless information network, or any combination thereof.

According to an aspect, customer engagement portal 300 can use WIFI device 324 to be coupled to a WIFI enabled communication device such as a mobile device, smart phone, home computer, laptop computer, Netbook, or any other WIFI enabled device capable of connecting to a WIFI network. Communication interface 330 and processor 302 can be used to enable a WIFI enabled communication device to access network device data, site data, data files sent from the customer engagement platform, or any combination of data accessible using the wireless energy network. For example, a mobile device can access a WIFI network and can be used to access a wireless energy network having a network device. In other forms, customer engagement portal 300 can include a web server capable of communicating web services that can be accessed by a mobile device (or other system or device), via a web based environment. For example, customer engagement portal 300 can output portions or all of a graphical user interface as described in FIGS. 5A-5F, or other graphical user interfaces that can be output by a web server. As such, a user having a WIFI enabled communication device can be coupled to customer engagement portal 300 using WIFI device 324 and monitor, create and manage operating conditions, home profiles, user profiles, device profiles, user schedules, proximity detection, demand response preferences, energy savings preferences, other control settings, view data files sent from the customer engagement platform, or any combination thereof. Other settings and operating conditions can be accessed, monitored, or managed as needed or desired.

According to another aspect, customer engagement portal 300 can include proximity detection module 338 that can be accessed by processor 302 to enable and disable proximity control at a site. For example, proximity detection module 338 and processor can be used to detect a distance between a mobile device having a location reporting device and the site. Processor 302 can be used to identify a current operating condition of a network device, and identify an updated operating condition of the network device in response to the detected distance. Processor 302 can be used to initiate generation of an outgoing message to include an updated operating condition in response to the distance. According to a further aspect, customer engagement portal 300 can be configured to receive location data using an information network having a server configured to communicate location data associated with a mobile device having a location reporting device that is associated with a site. Location data can be stored within memory 304 and used to monitor a distance and direction between a site and the mobile device.

According to an aspect, customer engagement portal 300 can include a plug computer employing a Linux based server configured to manage energy use at a site. For example, portal 300 can include a Java enabled processor as processor 302, memory 304 configured to store incoming and outgoing wireless energy network messages, Zigbee device 322 capable of accessing a wireless energy network, and information network interface 316 capable of initiating communication with an information network. Customer engagement portal 300 can also include communication interface 330 operably coupled to bus 308 and Zigbee device 322 coupled to bus 308. Through utilizing a Java enabled processor and Linux operating system, customer engagement portal 300 can deploy a web server (not expressly illustrated in FIG. 3) and a Java environment to handle and convert XML data received using a web server into Java objects that can be used to communicate various data files to the user.

As further illustrated in the block diagram of FIG. 3, a thermostat can be incorporated into the customer engagement portal 300. The thermostat functionality of the customer engagement portal can include a temperature and humidity sensors 352, and one or more I/O devices 354 to allow a user to provide an input to site controller 300. For example, I/O device 354 can enable a user can to select a mode (e.g. off, A/C, Heat, Fan, etc.), a smart energy mode (e.g. proximity, vacation, smart schedule, etc.), or various other features or combinations of features. Customer engagement portal can also include a power interface 356, and a bus interface 358. The thermostat of the customer engagement portal 300 can also include a processor or controller 360, and one or more control relays 362 to control a remote unit such as an HVAC unit, heat pump, other appliances, or any combination thereof.

According to a further aspect, the thermostat of the customer engagement portal 300 can also include a one or more wireless devices 364 capable of communicating with one or more associated wireless networks, a memory 366, and a display interface 368. Display interface 368 can be configured to engage one or more LCD displays, touch screens, one or more LEDs, or various other display technologies. Customer engagement portal 300 can also include a precision measurement unit (PMU) 370 configured to measure energy consumed by an associated network device, and a profile module 372 that can include network protocol configuration data, user profile data, device data, seasonal profile data, or various other types of data that can be accessed during use of thermostat. According to an aspect, the thermostat of the controller 300 is a non-programmable thermostat that does not include an enabled programmable thermostat scheduling feature accessible by a user engaging wireless thermostat. As such, a limited amount of scheduling functionality is needed or desired within the portal 300 and a user can use a scheduling tool or various other features provided herein to enable and disable use of the thermostat.

According to a particular aspect, customer engagement portal 300 can be configured as a plug-device that can be plugged directly to a wall socket or other power receptacle and can include various components (not expressly shown in FIG. 3). In another aspect, customer engagement portal 300 can be a counter-top control panel that is not fixed to a specific structure and thus facilitates movement about a site. In these aspects, customer engagement portal 300 can also include an expansion slot such as a network interface or Ethernet port, one or more USB interfaces or mini-USB interfaces, an SDIO slot, additional data or plug interfaces, Zigbee and Z-wave slot, or any combination thereof. Accordingly, this feature allows for additional memory or functionality to be added to the customer engagement portal 300 or to the thermostat at some point in the future, thus increasing the flexibility of the device. Customer engagement portal 300 can include an internal or external AC, DC, AC to DC converter power module, or any combination thereof to power customer engagement portal 300. According to an aspect, customer engagement portal 300 can be provided as a small form factor unit to allow for easy installation, use, and discretionary placement. For example, customer engagement portal 300 can include a plug computer based on Marvell Corporation's Kirkwood® microprocessor, Part Number 6281 and associated components. In another form, customer engagement portal 300 can include a plug computer including specifications described in "Sheeva Plug Development Kit Reference Design", version 1.1, and previous versions which are herein incorporated by reference. Other processors having various other speeds and supporting components can also be used. According to an aspect, customer engagement portal 300 can include various buses that can be used to install one or more wireless modules. For example, controller 300 can include a UART bus interface that can be used to interface a Zigbee module, WIFI module, Bluetooth Module, various other modules or combinations thereof. Various other buses can also be used including but not limited to a USB bus, a SPI bus, an SDIO bus, a mini-USB bus, or any combination thereof. Customer engagement portal 300 can include buses that can be located internal or external to a housing of customer engagement portal 300.

Figure 4:
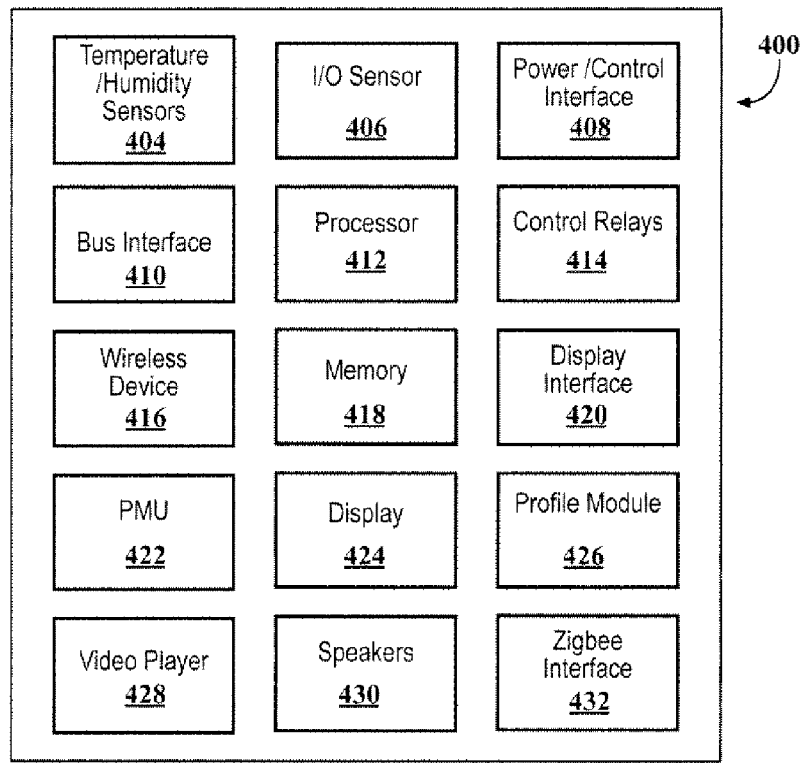
FIG. 4 illustrates a block diagram of the customer engagement portal configured to mate with a thermostat according an aspect of the disclosure.

FIG. 4 illustrates block diagrams of a network device, illustrated generally as a thermostat 400, capable of being coupled with a customer engagement portal. In other words, contrary to the design disclosed in FIG. 3, the thermostat 400 and customer engagement portal are disposed as separate units, but are capable of being combined to create a multimedia thermostat 400 capable of communicating with the customer engagement platform and any other devices connected to the network. In this aspect, the thermostat 400 is permanently mounted on a wall of the site, and the customer engagement portal 402 is coupled to the thermostat via corresponding Zigbee enabled communicate interfaces 432. In an aspect, the customer engagement portal 402 is configured to be docked directly with the thermostat 400, and allows for the customer engagement portal 402 to be easily taken off the wall while leaving the thermostat 400 behind to control an HVAC unit of the site. In other words, a thermostat enabled docking station, i.e. the thermostat 400, is mounted or coupled with the wall and the customer engagement portal can be selectively coupled or removed from the docking station. In addition, the ability for the thermostat 400 and customer engagement portal 402 to communicate via the Zigbee communication interfaces 432 or a mobile application allows for the continued control of the thermostat 400 via the portal 402 while the portal 402 and thermostat 400 are disengaged. In an aspect, the thermostat 400 and the customer engagement portal 402 can communicate via XMPP PubSub protocol. In an aspect, the customer engagement portal 402 can also be used as a tablet.

FIG. 4 illustrates a thermostat 400 according to an aspect of the disclosure. Thermostat 400 can include a temperature and humidity sensors 404, and one or more I/O devices 406 to allow a user to provide an input to thermostat 400. For example, I/O device 406 can enable a user can to select a mode (e.g. off, A/C, Heat, Fan, etc.), an alternative mode (e.g. proximity, vacation, smart schedule, etc.), or various other features or combinations of features. Thermostat 400 can also include a power interface 408, and a bus interface 410. As mentioned previously, the thermostat 400 can also include a processor 412, and one or more control relays 414 to control a remote unit such as the HVAC unit, of a heat pump, other appliances, or any combination thereof.

According to a further aspect, thermostat 400 can also include a one or more wireless devices 416 capable of communicating with one or more associated networks, a memory 418, and a display interface 420. Display interface 420 can be configured to engage one or more LCD displays, touch screens, one or more LEDs, or various other display technologies illustrated generally as display 424. Various types of display technology having single color, multicolor, or any combination thereof can be used, including, but not limited to LED displays, TFT displays, OLED displays, LCD displays, flexible lighting displays, or any combination thereof. Accordingly, following receipt of the data file from the server, the data file can be communicated to the user through the display. The thermostat can also include a video player 428 for allowing the thermostat 400 to play the received data files from the customer engagement platform on the display 424. Since most data files also include associated audio, the thermostat 400 can also include speakers 430 for playing the associated audio files received from the server. As previously mentioned, the data file can include a video file, music file, weather forecasts, sports scores, other current news, advertisements or any other information. In addition, the thermostat 400 is also capable of playing audio files received independent of the video file from the customer engagement platform, or playing audio files transferred from other devices associated with the network. In another aspect, the thermostat 400 is configured such that it is capable of integrating AirPlay® wireless technology. Accordingly, the thermostat 400 will be capable of streaming music from within the site, and allows for the enjoyment of an iTunes® or other music library at the thermostat 400. In a further aspect, the thermostat 400 can stream live radio such as Internet radio, including from on-line streaming sources such as Pandora or Slacker. In accordance with another aspect, the thermostat can also stream videos or other data from YouTube and Netflex. Other sources for streaming video and audio could be utilized. In some aspects, the thermostat 400 is a mobile unit, and thus the integration of AirPlay® allows for easy enjoyment of the music library in any location or room of the site at any given time. Incorporating this technology further increases the multimedia capability of the thermostat and increases the utility of the unit. As previously mentioned, in an aspect, the customer engagement portal 402 can be docked with the thermostat 400. In this aspect, when the portal 402 is removed from the thermostat 400, the speakers 430 and wifi capability 416 are left behind on the thermostat 400. In another aspect, the speakers 430 and display 420 can be removed from the wall in conjunction with the customer engagement portal 402, allowing the customer engagement portal 402 to be used as a tablet. Accordingly, the TSTAT would remain functional using a mobile application or user interface left behind on the thermostat 400 mounted to the wall.

In another aspect, the data files can be preloaded and stored on the memory 418 of thermostat for subsequent display to a user. For example, the data files can include instructional videos regarding the appropriate ways to use the thermostat for achieving proper use and educating a user with regard to the most efficient operation. This is advantageous because it allows a user to access the instructional video at an appropriate time for the user while also improving the communication between third parties, utility providers and customers which leads to improved energy management.

Figure 5:
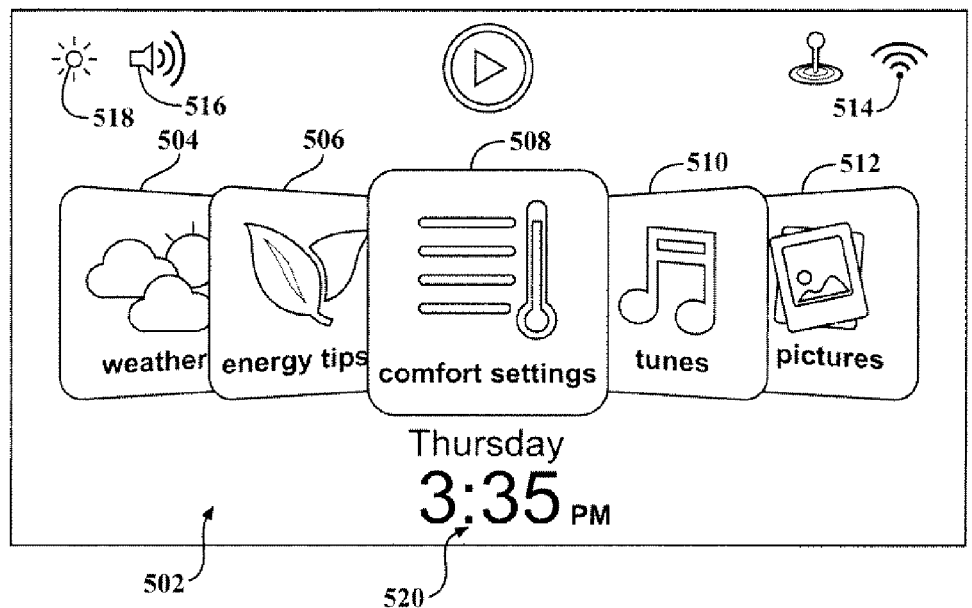
FIG. 5 illustrates a graphical user interface of the customer engagement portal illustrating a home screen associated with the energy management system according to an aspect of the disclosure.

FIG. 5 illustrates a graphical user interface 502 of the customer engagement portal 500 illustrating an example of a home screen associated with the energy management system. As previously mentioned, the graphical user interface 502 can be configured to engage one or more LCD displays, touch screens, one or more LEDs, or various other display technologies. Various types of display technology having single color, multicolor, or any combination thereof can be used, including, but not limited to LED displays, TFT displays, OLED displays, LCD displays, flexible lighting displays, or any combination thereof. In an aspect, the graphical user interface 502 for the home screen can include a plurality of different icons that a user can interact with to access different functionality of the customer engagement portal 500. In accordance with one aspect, the graphical user interface 502 can include a weather icon 504, an energy tips icon 506, a comfort settings icon 508, a tunes icon, 510, and a pictures icon 512.

Each of these icons can serve as an interface for the user, such as through touch screen activation, to allow for retrieval of information from the customer engagement portal 500. It will be understood that more, less or different icons can be included on the graphical user interface 502 to present the user with different options and interfaces. The graphical user interface 502 can also include other icons, such as a wireless icon 514, which can visually indicate whether the portal 500 is connected to a wireless network and through interface therewith, the user can effectuate such a connection if one does not exist or establish a connection with another wireless network. In accordance with another aspect, as shown, the graphical user interface 502 can include a sound icon 516 that allows the user to alter the volume of sound emitted from the customer engagement portal 500 or mute the sound entirely. According to yet a further aspect, the graphical user interface 502 can include a brightness icon 518 that allows the user to adjust the brightness of the interface 502 for the portal 500. The graphical user interface 502 can also include a time and date icon 520, which displays date and time information. Through engagement with the time and date icon 520, the user can adjust the time, date, etc. Other icons and displays may also be included on the interface 502. As previously mentioned, various types of display technology having single color, multicolor, or any combination thereof can be used with the graphical user interface 502, including, but not limited to LED displays, TFT displays, OLED displays, LCD displays, flexible lighting displays, or any combination thereof. In addition, as previously mentioned, the display is a touch screen display for presenting a plurality of user inputs, such as icons to select. It will also be appreciated that the various options available through the customer engagement portal 500, including as discussed below, can be accessed by other devices, including via a mobile phone or mobile device associated with the portal 500 or other network device.

Figure 6A:
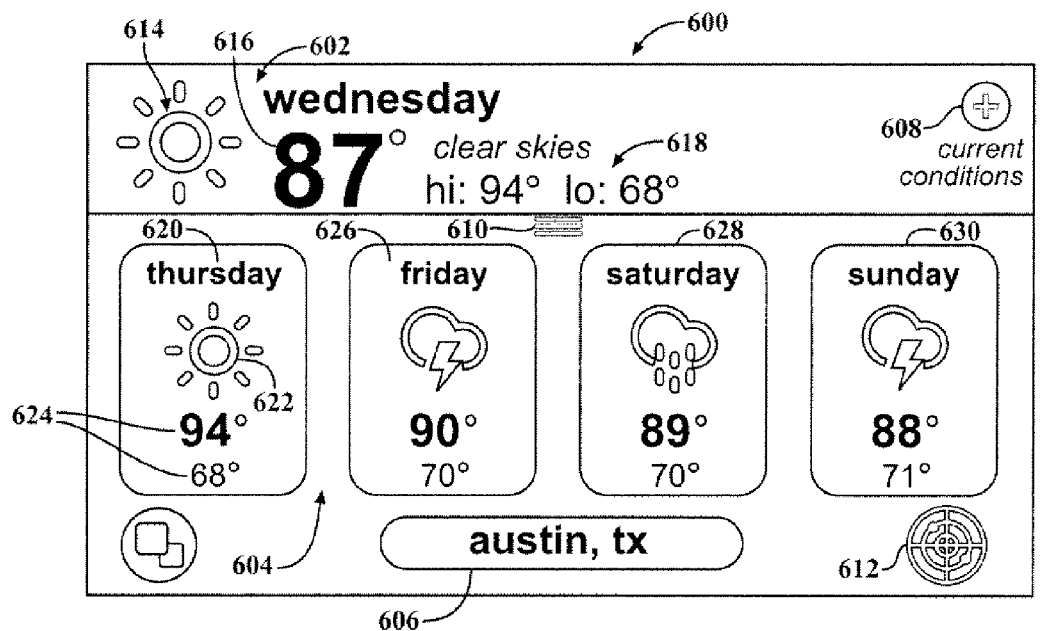
FIG. 6A illustrates a weather interface of the customer engagement portal according to an aspect of the disclosure.

FIG. 6A illustrates a weather interface 600 of the portal 500 that can be accessed upon selection of the weather icon 504 shown in FIG. 5. The weather interface 600 allows the user to view weather conditions and forecasts at the site. The weather interface can include a current day weather forecast display 602 and an extended forecast display 604. The weather interface 600 can also include a location display 606 that identifies the location associated with the weather forecast display 602 as well as the extended forecast display 604. The weather interface 600 also includes a detailed current conditions icon 608, a detailed forecast icon 610, and a radar display icon 612. As previously mentioned, various types of display technology having single color, multicolor, or any combination thereof can be used with the weather interface 600, including, but not limited to LED displays, TFT displays, OLED displays, LCD displays, flexible lighting displays, or any combination thereof. In addition, as previously mentioned, the weather interface 600 is a touch screen display for presenting a plurality of user inputs, such as the detailed conditions icon 608, the detailed forecast icon 610, and the radar display icon 612, and configured to allow the user to touch the screen and display additional weather information associated with the site or other location requested.

The current day weather forecast display 602 can include information about current weather conditions. According to one aspect, the current day weather forecast display 602 can include a current conditions icon 614 that visually represents the weather conditions for the current day, such as sunny, cloudy, rainy, etc. The current day weather forecast display 602 can also include a current temperature display 616, and a hi/low temperature display 618. It will be appreciated that the current weather forecast display 602 can include more, less or different displays.

According to one aspect, the extended forecast display 604 can include a plurality of forecasted day display icons representing the forecast for a succession of days after the current day. It will be understood that the extended forecast display 604 can include icons representing the forecast for any number of days, such as for one day or for as many as ten days. It will also be appreciated that the display can be toggled to allow the user to view screens containing extended forecasts of different lengths, i.e., number of days. With reference to the forecasted next day display icon 620 of the extended forecast display 604, the forecasted weather is visually depicted. The forecasted next day display icon 620 can also include a next day conditions display 622 that visually represents the forecasted weather condition for the next day, i.e., sunny, cloudy, rainy, etc. The forecasted next day display icon 620 can include a forecasted next day hi/lo temperature display 624 that identifies the low and hi temperatures that are forecasted for the next day. The forecasted next day display icon 620 can be actuated, such as through the touch screen, to access more detail about the forecasted weather conditions for the next day, including an hour by hour forecast. Each of the other forecasted day display icons 626, 628, and 630 included in the extended forecast display 604 can include the same information as that discussed in connection with the next day display icon 620, including the ability to retrieve more information about that forecast for that day. It will be understood that more, less or different information may be included or associated with each of the forecasted day display icons 620, 626, 628, and 630.

The location display 606 indicates the location for which the weather information on the weather interface 600 relates. In accordance with one aspect, the location display 606 can be set to provide weather information for the site where the portal 500 is associated. The user can interact with the location display 606 in order to change the location for which the weather information relates. For example, if the user is going to be travelling to another city and state, such as Orlando, Fla., and wants to check the weather and forecast in that location, they can alter the location display 606 to reflect a different location and then the weather information on the weather interface 600 will relate to the location identified in the location display 606.

Figure 6B:
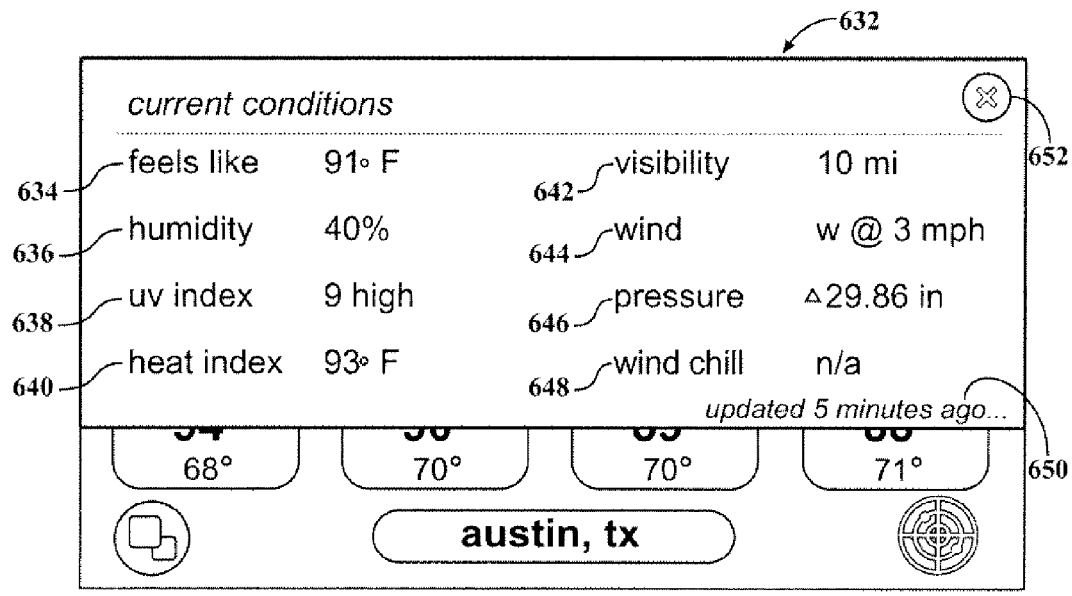
FIG. 6B illustrates a current weather conditions display on the customer engagement portal according to an aspect of the disclosure.

FIG. 6B illustrates the current weather conditions display 632 that can be accessed upon the user interfacing with the current conditions icon 608. According to an aspect, the current weather conditions display 632 can include additional detailed information about the current weather at the location selected in the location display 606, including what the temperature feels like 634, the humidity 636, the uv index 638, the heat index 640, the visibility 642, the wind, speed and direction 644, the pressure 646, and the wind chill 648. The current weather conditions display 632 can also include an indication as to how up to date the information is, as generally indicated by reference number 650. More, less or different information can be included on the current weather conditions display 632. To return back to the weather interface 600, the user can engage the exit current conditions icon 652, which, according to an aspect, can be represented as an "x".

Figure 6C:
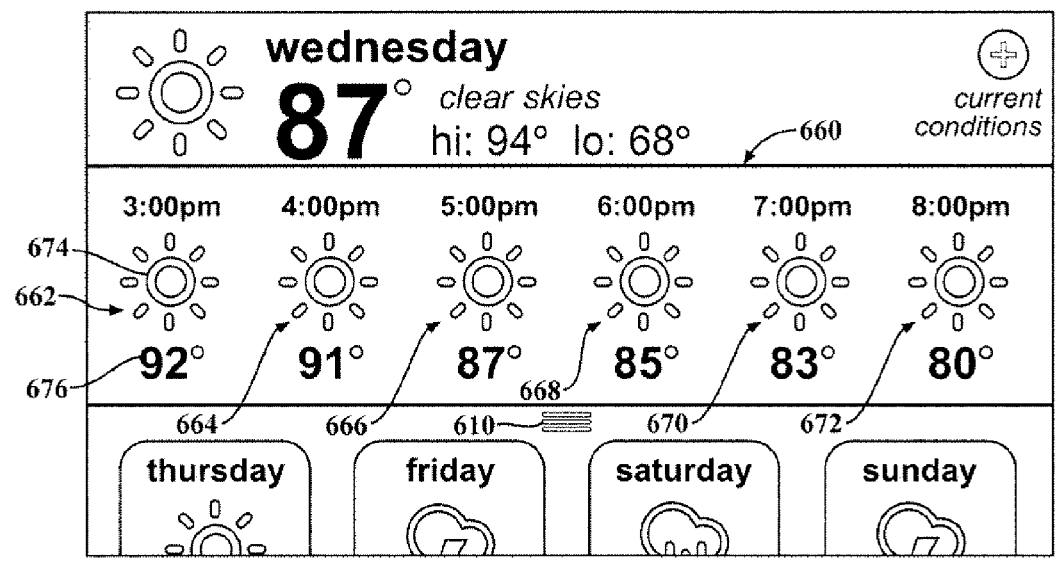
FIG. 6C illustrates an hourly weather forecast display on the customer engagement portal according to an aspect of the disclosure.

FIG. 6C illustrates the detailed weather forecast display 660 that can be accessed upon the user interfacing with the detailed forecast icon 610. According to an aspect, the detailed weather forecast contains forecasted weather information broken down to the hour. As represented by the hourly forecast icons, 662, 664, 666, 668, 670, and 672, the forecasted weather information can include the forecasted condition 674, i.e., sunny, rainy, cloudy, etc., as well as the forecasted hourly temperature 676. As exemplarily shown, the forecasted time range is from 3:00 pm to 8:00 pm. It will be understood that more or less hours may be illustrated. It should also be understood that the amount and type of weather information provided for each hour can vary. Additionally, while this detailed forecast is depicted as being broken down into hourly segments, it will be appreciated that the detailed forecasts can be broken down into other segments of time, such as fifteen minute increments or segments greater than an hour. The detailed forecast icon 610 can be engaged to return to the weather interface 600.

Figure 6D:
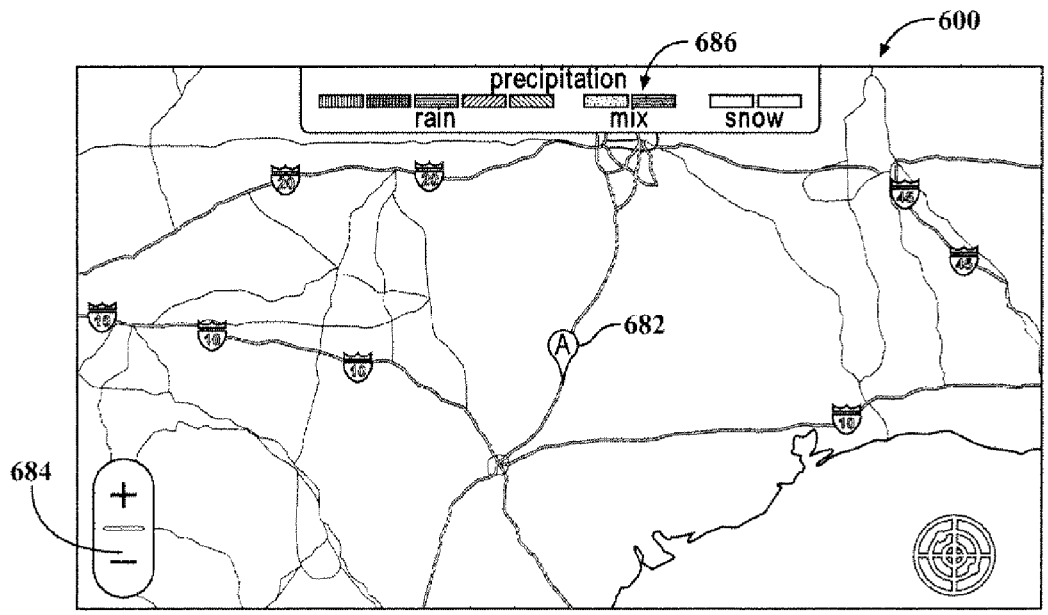
FIG. 6D illustrates a weather radar display on the customer engagement portal according to an aspect of the disclosure.

FIG. 6D illustrates the weather radar display 680 that can be accessed upon the user interfacing with the radar display icon 612. According to an aspect, the weather radar display 680 illustrates the weather radar for an area that includes the location selected in the location display 606. The weather radar display 680 can include a marker 682 identifying the specific location from the location display 606. The weather radar display 680 can also include a zoom icon 684 that allows the user to zoom in or out on the weather radar display 680. The weather radar display 680 can also include a precipitation legend 686. It will be appreciated that the weather radar display can include more, less or different features and information. The radar display icon 612 can be engaged to return to the weather interface 600.

Figure 7A:
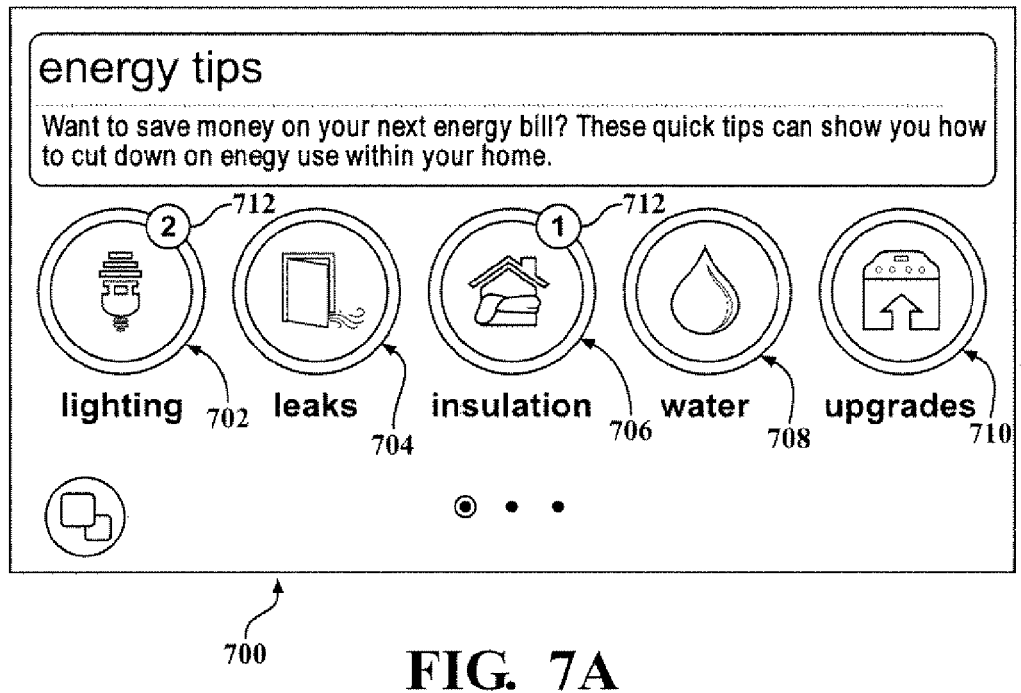
FIG. 7A illustrates an energy tips interface of the customer engagement portal according to an aspect of the disclosure.

FIG. 7A illustrates an energy tips interface 700 that can be reached by the user upon selection of the energy tips icon 506 in FIG. 5. As shown, according to an aspect, the energy tips interface 700 can include various icons that provide the user with specific tips as to how to decrease their energy consumption. For example, the energy tips interface 700 can include a lighting icon 702, a leaks icon 704, an insulation icon 706, a water icon 708, and an upgrade icon 710. It will be appreciated that icons for other tips are specifically contemplated and may be included as part of the energy tips interface. Indeed, more or less tips may be included in accordance with the disclosure. According to an aspect of the disclosure, when the user selects these icons, they will have access to specific energy saving tips in regards to each of those categories, as is discussed in more detail below. Additionally, the energy tips interface 700 can let the user know by way of a new tip indicator 712 that new tips in a particular category are available for review by the user. In this example, the new tip indicator 712 reflects that there are two new energy tips with regard to lighting and one new energy tip in regard to insulation. It will be appreciated that the tips can be presented in different ways and that more, less or different icons can be included on the energy tips interface 700.

Figure 7B:
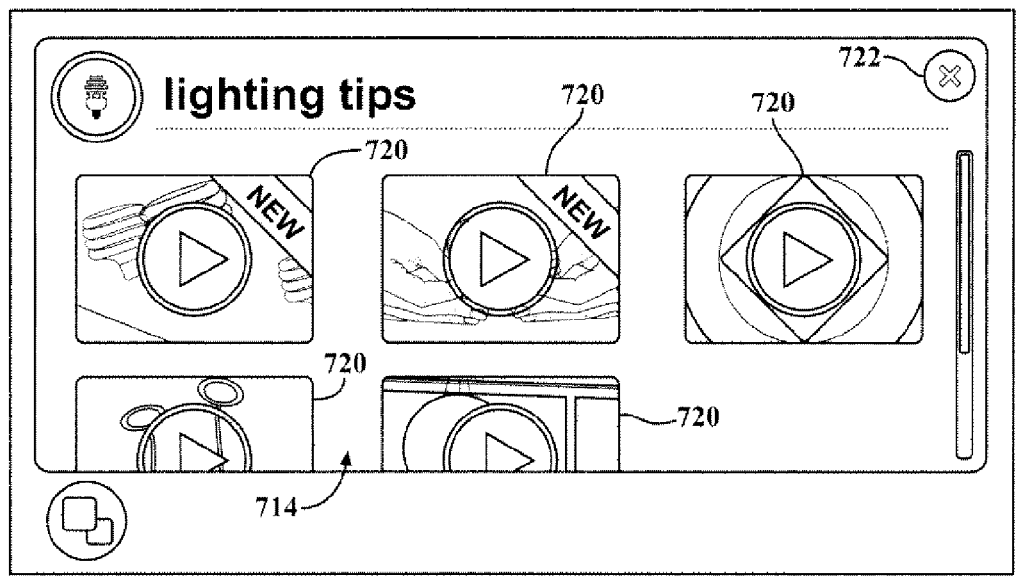
FIG. 7B illustrates an lighting tips display with exemplary video tutorials capable of being displayed on the customer engagement portal according to an aspect of the disclosure.

In accordance with an aspect of the disclosure to access energy tips in regards to lighting, the lighting icon 702 is engaged. The portal 500 can then display the lighting tips display 714, which is shown in FIG. 7B. According to an aspect, the lighting tips display 714 can include various video clips 720 or tutorials that provide tips as to how to conserve energy in the area of lighting. As can be seen, the new video clips 720 can contain a label to indicate that they have not yet been seen by the user. It will be appreciated that while the clips are described as being video clips, the tips can be presented in a variety of other forms, including pictures, written text, drawings, or the like. While only the lighting tips display has been specifically shown and described, it will be appreciated that similar displays can be associated with the other icons, including the leaks icon 704, the insulation icon 706, the water icon 708, and the upgrades icon 710, as well as any other icons presented on the energy tips interface. To return to the energy tips interface 700, the exit icon 722 is engaged. As previously mentioned, various types of display technology having single color, multicolor, or any combination thereof can be used with the energy tips interface 700, including, but not limited to LED displays, TFT displays, OLED displays, LCD displays, flexible lighting displays, or any combination thereof. In addition, as previously mentioned, the display is a touch screen display for presenting a plurality of user inputs, such as the lighting icon 702, the leaks icon 704, the insulation icon 706, the water icon 708, and the upgrades icon 710, and configured to allow the user to touch the screen and see tips associated with each of these categories.

Figure 7C:
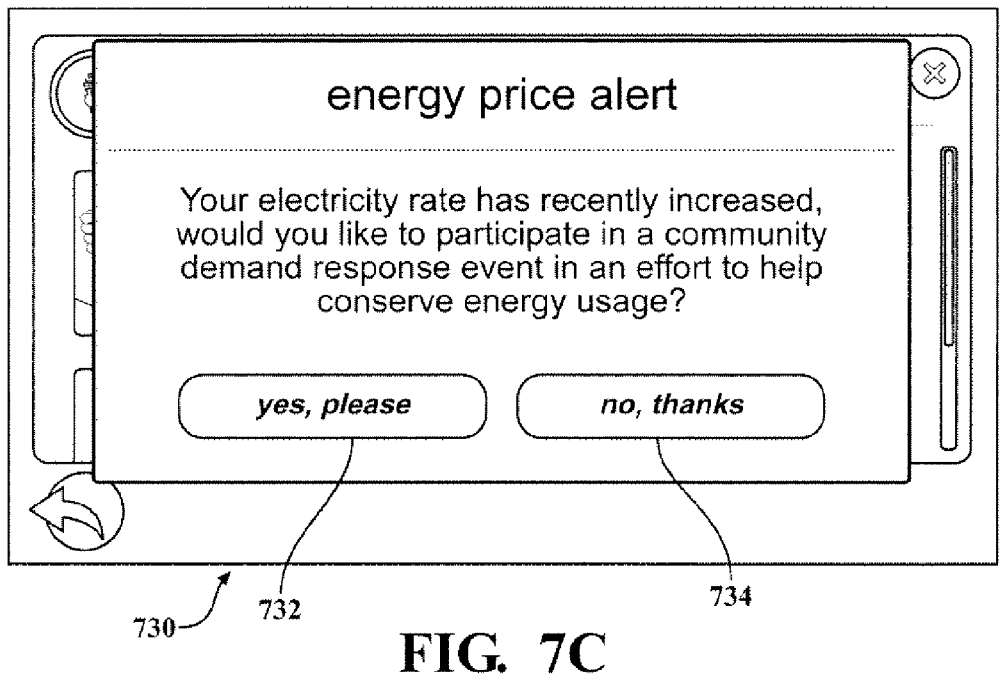
FIG. 7C illustrates an exemplary energy price alert display capable of being displayed on the customer engagement portal according to an aspect of the disclosure.

In accordance with an aspect, an energy price alert display 730 can be presented on the portal 500 that provides energy specific information to the user. According to an aspect shown in FIG. 7C, the energy price alert display 730 may let the user know that that electricity rate has increased and inquire as to the interest of the user in participating in a community demand response event which is designed to help conserve energy. The user can indicate his interest for participating in the demand response event by touching the "yes" button icon 732. The portal 500 can then adjust the energy usage according. The user can also indicate his desire not to participate in the demand response event by touching the "no" button icon 734. It will be appreciated that the energy price alert display 700 could also provide other alert information to the user. The energy price alert display 700 can be presented to the user at any time. In accordance with one aspect, it is presented when the user engages the energy tips icon 506. In accordance with another aspect, the energy price alert display 700 can be presented when the user engages the portal 500.

Figure 8A:
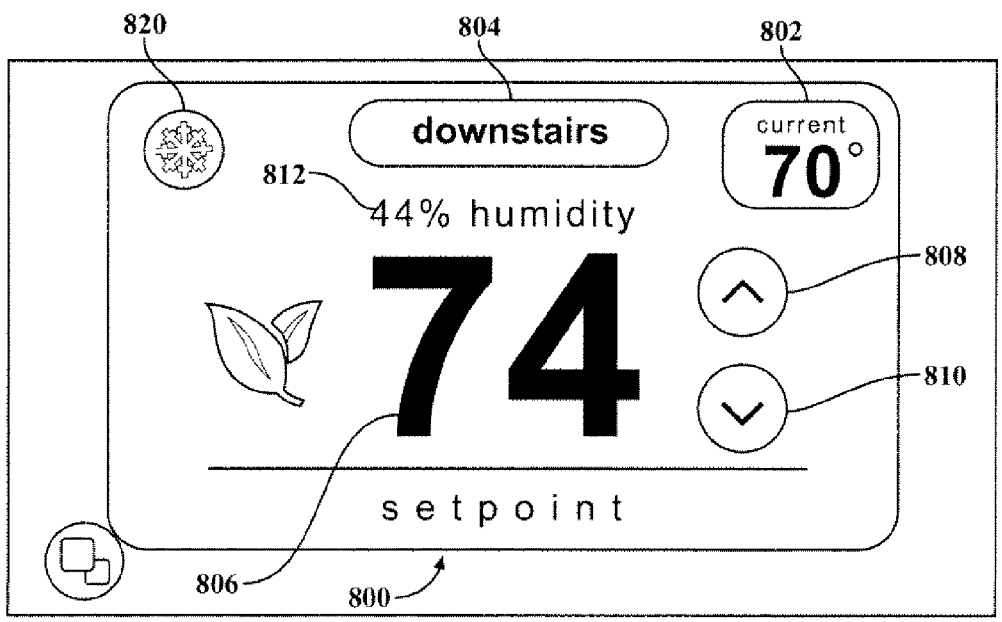
FIG. 8A illustrates an exemplary comfort setting display on the customer engagement portal according to an aspect of the disclosure.

FIG. 8A illustrates a comfort setting display 800 that can be viewed by the user after selecting the comfort settings icon 508 on the graphical user interface 502 in FIG. 5. In accordance with an aspect, the comfort settings display 800 can allow control of the thermostat at the site. The comfort setting display 800 can include an inside temperature display 802 and a room location display 804 that identifies in what room the reading from the temperature display 802 was taken. The comfort setting display 800 can also include a thermostat setting display 806, a temperature increase input 808 and a temperature decrease input 810. As previously mentioned, various types of display technology having single color, multicolor, or any combination thereof can be used with comfort setting display 800, including, but not limited to LED displays, TFT displays, OLED displays, LCD displays, flexible lighting displays, or any combination thereof. In addition, as previously mentioned, the display is a touch screen display for presenting a plurality of user inputs, such as the temperature increase input 808 and the temperature decrease input 810, and configured to allow the user to touch the screen and initiate altering an operating condition at the site. In accordance with an aspect, the comfort setting display 800 also can include a humidity reading display 812. It will be appreciated that the comfort setting display 800 can include more, less or different displays.

Figure 8B:
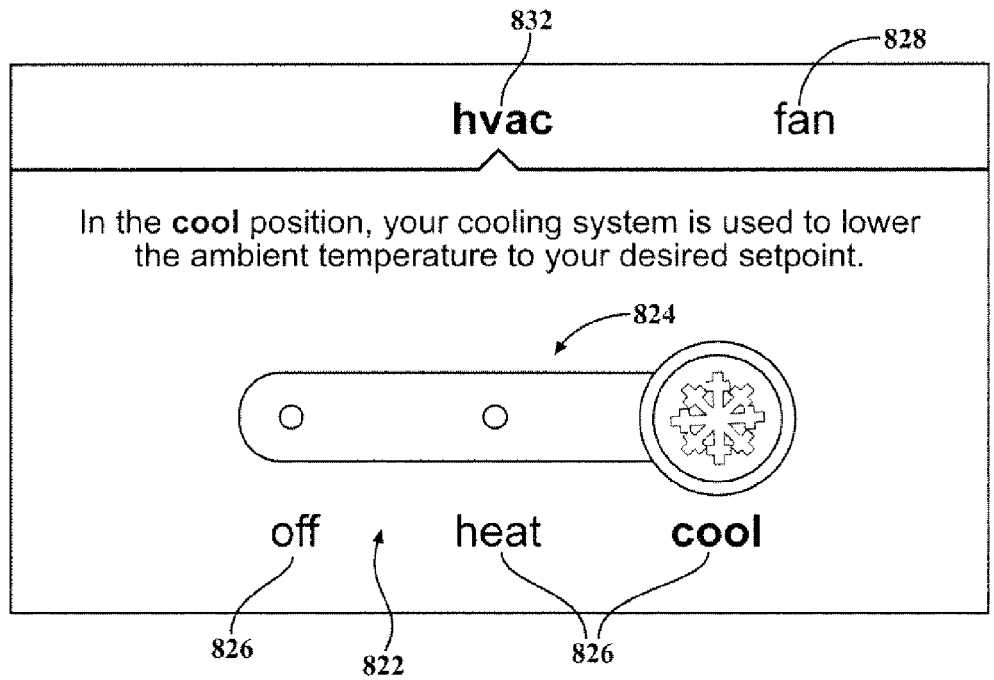
FIG. 8B illustrates an exemplary hvac mode switch for the customer engagement portal according to an aspect of the disclosure.

According to a feature of the disclosure, the comfort setting display 800 can also include a setting icon 820 that allows a user to adjust the thermostat mode. As shown in FIG. 8A, the setting icon 820 is depicted as a snowflake, which according to an aspect is an indication that the thermostat is currently in a cool mode. Upon engagement of the setting icon 820, the hvac display screen 822 in FIG. 8B can appear. The hvac display screen 822 can include an hvac mode switch 824 and indicators 826 configured to identify a mode. For example, the hvac mode switch 824 can be placed in an off mode, in a heat mode, or an air condition mode. An associated indicator below each mode within hvac display screen 822 can be illuminated in connection with an operating mode setting. In other forms, indicators 826 can be placed behind an associated text and illuminated to indicate a current mode. For example, customer engagement portal 500 can include a thin material that can allow a backlight, such as LED lighting to illuminate and show text. In another form, the hvac mode switch 824 can be in the form of a touch screen display to allow a user to touch the screen to select the mode. Various other input and display methods or combinations thereof can be used. Again, a variety of different types of displays can be utilized as discussed above and more, less or different icons may be included.

Figure 8C:
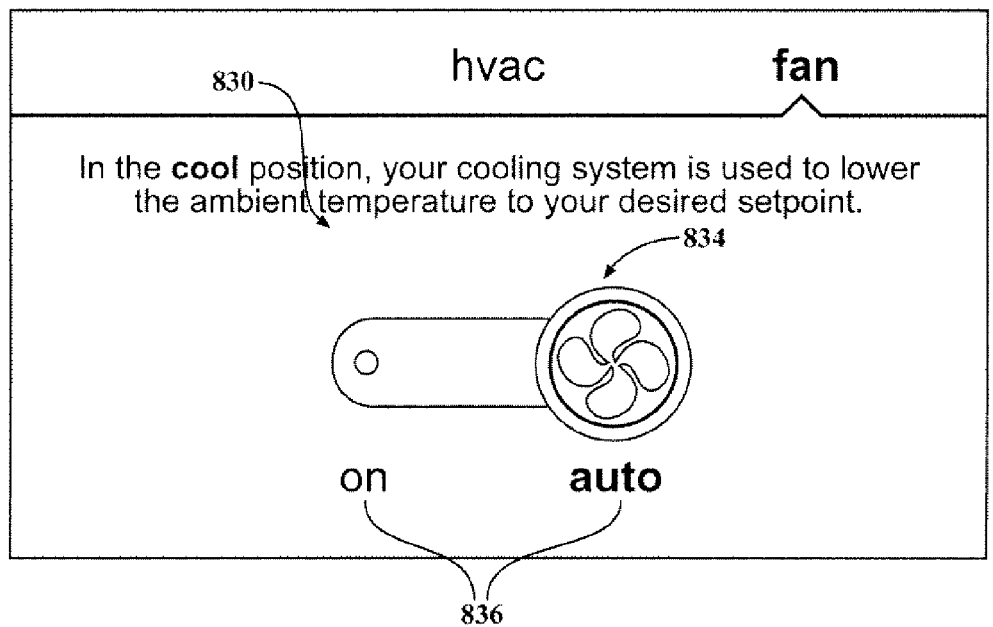
FIG. 8C illustrates an exemplary fan mode switch for the customer engagement portal according to an aspect of the disclosure.

Accordingly to another aspect, the hvac display screen 822 can include a fan display screen icon 828 that allows a user to switch to a fan display screen 830. The fan display screen icon 828 can be located adjacent an hvac display icon 832, which may allow the user to switch back and forth between the hvac display screen 822 and the fan display screen 830, as shown in FIG. 8C. In accordance with a feature, the fan display screen 830 can include a fan mode switch 834 and indicators 836 configured to identify a mode. For example, the fan mode switch 834 can be placed in an off mode or in an auto mode. An associated indicator below each mode within fan display screen 830 can be illuminated in connection with an operating mode setting. In other forms, the indicators 836 can be placed behind an associated text and illuminated to indicate a current mode. For example, customer engagement portal 500 can include a thin material that can allow a backlight, such as LED lighting to illuminate and show text. In another form, the fan mode switch 324 can be in the form of a touch screen display to allow a user to touch the screen to select the mode. Various other input and display methods or combinations thereof can be used. Again, a variety of different types of displays can be utilized as discussed above and more, less or different icons may be included. According to another aspect, if the thermostat is operating in a fan mode, the setting icon 820 can be depicted as a fan and engagement therewith can direct the user to the fan display icon 830. Similarly, in a heat mode, the setting icon 820 can be depicted as a flame.

Figure 9A:
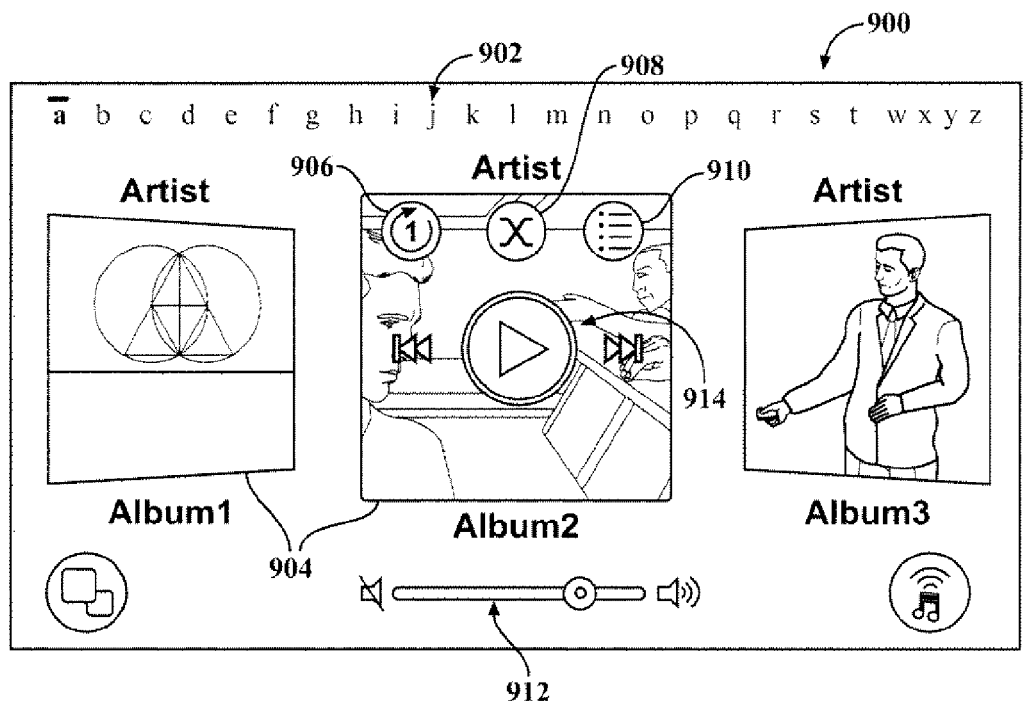
FIG. 9A illustrates a tunes display on the customer engagement portal according to an aspect of the disclosure.

FIG. 9A illustrates a tunes display 900 that can be viewed by the user after selecting the comfort settings icon 510 on the graphical user interface 502 in FIG. 5. According to an aspect, the tunes display 900 can include a directory bar 902, which is an alphanumeric directory of artists. The tunes display 900 can also contain a plurality of album icons 904 that represent song albums that are accessible on the portal 500. In accordance with an aspect of the disclosure, an album selection control 914 can be displayed that includes a play control, a scroll forward control, and a scroll back control. Through the utilization of album selection control 914, the user can scroll through the plurality of album icons 904 available on the portal 500 to select the album of choice. The tunes display 900 also includes a play entire album icon 906, a shuffle album icon 908 and a song playlist icon 910 to allow the user to enhance their listening experience. The tunes display 900 also includes a music volume icon 912 that allows a user to adjust the volume of any music playing. In accordance with another aspect, it will be appreciated that the tunes can be stored and arranged based on song title, music type and/or a variety of other ways. Additionally, in accordance with still another aspect, the individual songs can be ordered and arranged. According to still a further aspect, a searching feature can be provided to allow the user to easily locate music on the portal 500.

Figure 9B:
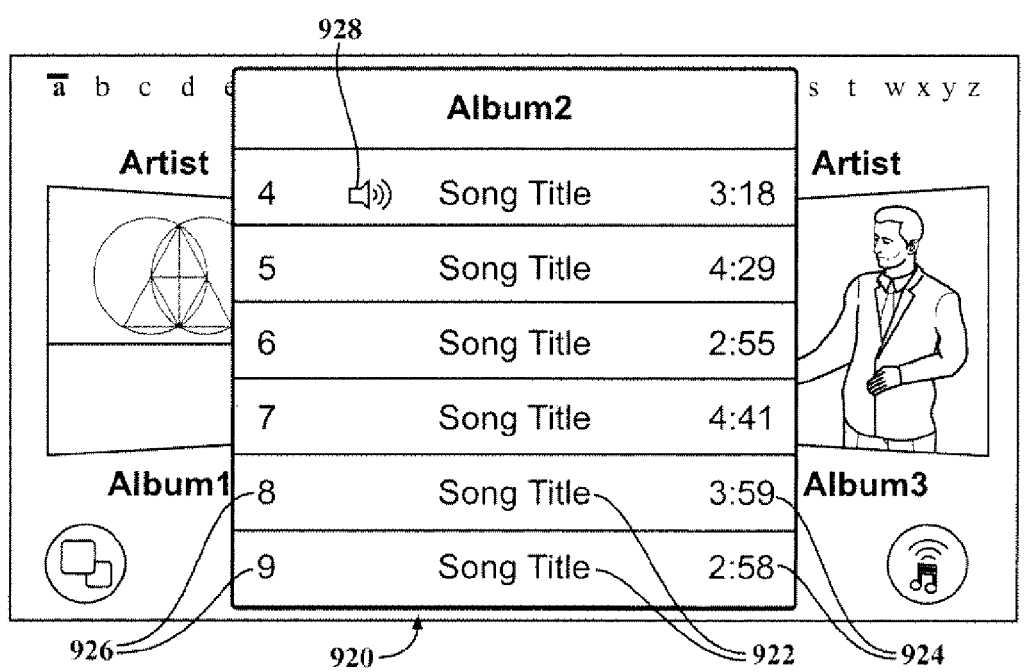
FIG. 9B illustrates an album playlist display for the customer engagement portal according to an aspect of the disclosure.

FIG. 9B illustrates an album playlist display 920 that can be viewed by the user after selecting one of the plurality of album icons 904. In this example, the user has selected the album icon associated with the album by the Gorillaz entitled "Plastic Beach" on the tunes display 900. According to the illustrated example, the album playlist display 920 can consist of a list of a plurality of individual song titles 922, the length of each song 924 as well as the track 926 each song occupies on the album. The album play list display 920 can also include a play icon 928 that indicates what song is currently being played.

Figure 9C:
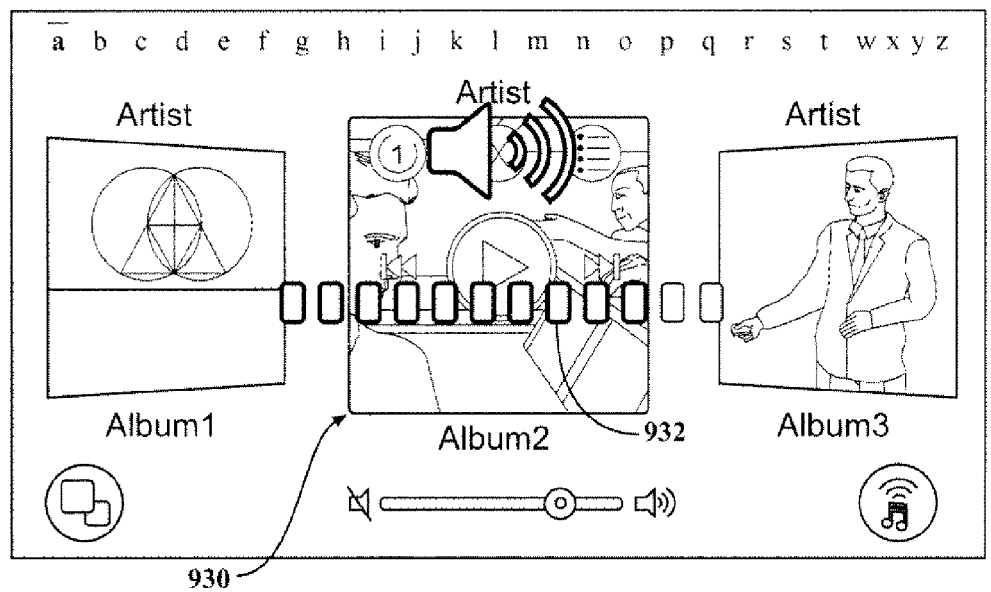
FIG. 9C illustrates a volume interface display for the customer engagement portal according to an aspect of the disclosure.

FIG. 9C is a volume interface display 930 that identifies the level of volume at which the music is being played. The volume level is represented by a volume bar 932, which can be adjusted by the user by employing the touch screen.

According to another feature of the disclosure, the tunes display 900 may allow the user to create their own playlists of songs from those stored on or accessible to the portal 500. The user can then listen to the playlist or store them for later listening. Again, as previously mentioned, various types of display technology having single color, multitude or any combination thereof can be used with the tunes display 900, including, but not limited to LED displays, TFT displays, OLED displays, LCD displays, flexible lighting displays or any combination thereof. In addition, as previously mentioned, the display is a touch screen display for presenting a plurality of user inputs, such as the directory bar, the play entire album icon 906, and the shuffle album icon 908, and configured to allow the user to touch the screen and initiate the selected function.

Figure 10:
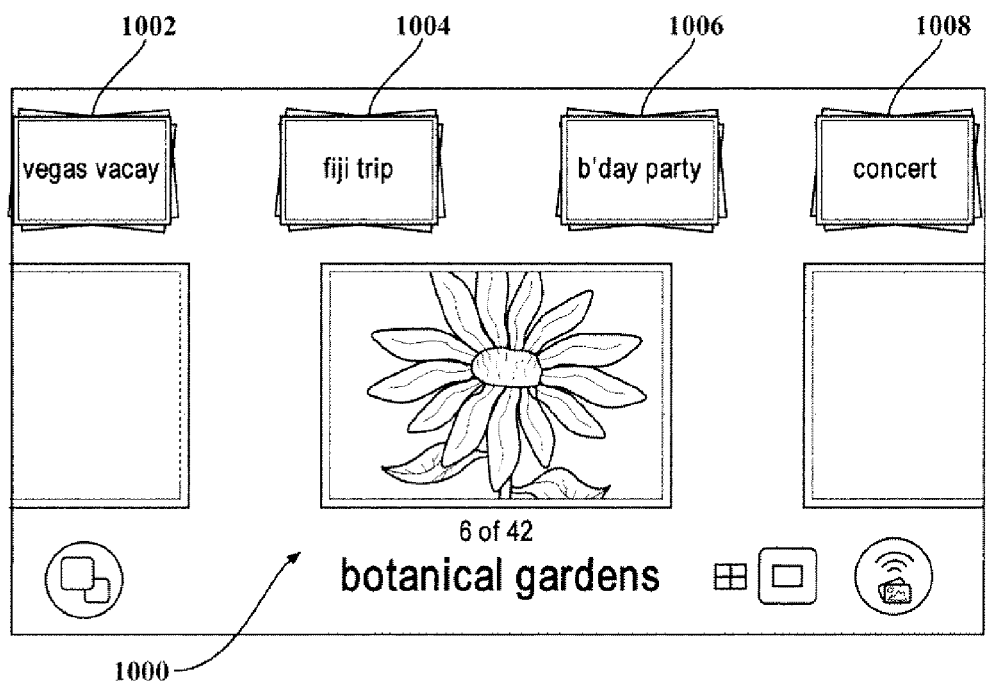
FIG. 10 illustrates a picture library display for the customer engagement portal according to an aspect of the disclosure.

FIG. 10 illustrates a picture library display 1000 that can be viewed by the user after selecting the pictures icon 512 on the graphical user interface 502 in FIG. 5. According to an aspect, the picture library display 1000 can allow a user to interact with the pictures stored on or accessible to the portal 500. According to another aspect, pictures can be stored on the portal 500 in a variety of ways. For example, the pictures can be stored in folders based on related photographs as may be illustrated by the albums icons 1002, 1004, 1006 and 1008. By way of another example, photographs can be individually stored on the portal 500. According to an aspect of the disclosure, the picture library display 1000 can allow the user to arrange photos for display as well as create photo albums. Additionally, in addition to photographs, the picture library display 1000 can provide access to other forms of media, such as video, etc.

In accordance with another aspect, the customer engagement portal can provide access to other things. For example, as previously mentioned, the customer engagement platform is configured to communicate data files to the customer engagement portal 500 including such items as informational or instructional videos associated with a specific network device disposed at the site. In an aspect, the data file can include a tutorial directed to proper use of the device, such as a thermostat disposed at the site. The tutorial can present a plurality of questions to the user, and allow the user to touch the question to receive additional information and/or instructional videos with regard to that specific aspect of the device. For example, when the network device is a thermostat, the tutorial can include information and videos directed to how to override set-points, how to program the thermostat with seasonal or weekly profiles, how to properly change degree set-points, videos disclosing current temperature and energy pricing within an areas, how to use proximity control, or any combination thereof. In another aspect, the tutorials can be pre-loaded on the specific network device prior to installation for viewing by the user as required.

Additionally, the weather interface 600 can display a weather forecast video capable on the customer engagement portal according to an aspect of the disclosure. As previously mentioned, the customer engagement platform is configured to communicate data files to the customer engagement portal 500 including short videos communicating a local weather forecast. In an aspect, the customer engagement platform is configured to detect a specific location for the customer engagement portal 500, and pair the proper weather provider associated with area where the portal 500 is located. In other words, the customer engagement platform is configured to locate the corresponding weather forecast received from the information network and pair the local weather forecast with the portal based on its location.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A system for managing customer engagement, comprising:
   a customer engagement portal to be disposed at a site, said customer engagement portal configured to receive inputs, including inputs related to media information;
   at least one memory storing instructions;
   at least one processor associated with said customer engagement portal and configured to execute the instructions stored in said at least one memory to manage said media information;
   a first network device to be disposed at said site and communicatively coupleable with said at least one processor to wirelessly transmit a media stream therebetween, said first network device configured to output said media stream, and said first network device having an operating condition capable of being altered;
   a second network device to be disposed at said site and communicatively coupleable with said at least one processor to wirelessly transmit another media stream therebetween, said second network device configured to output said other media stream, and said second network device having another operating condition capable of being altered;
   a mobile device associated with said site and configured to initiate a change of at least one of said operating condition of said first network device while said first network device outputs said media stream and said other operating condition of said second network device while said second network device outputs said other media stream; and
   a customer engagement platform communicatively couplable with both said customer engagement portal and said mobile device, the customer engagement platform configured to provide the media information based on both a present location of said mobile device relative to said customer engagement portal and a tracked travel pattern of a user associated with the mobile device,
   wherein the tracked travel pattern of the user includes a determined frequency of the user being at the site and a previous movement of the user from one location to another location,
   wherein said operating condition and said other operating condition are independent of and unrelated to said media stream and said other media stream, and
   wherein said customer engagement portal is integrated into one of said first network device or said second network device.

2. The system of claim 1, wherein said media stream and said other media stream include an audio stream, a video stream, streams, or a combination of an audio stream and a video stream.

3. The system of claim 2, wherein said audio stream includes music.

4. The system of claim 3, wherein said first network device and said second network device are configured to output music at a same time.

5. The system of claim 4, wherein said first network device and said second network device are configured to output the same music at a same time.

6. The system of claim 4, wherein said first network device and said second network device are configured to output different music at a same time.

7. The system of claim 2, wherein said first network device and said second network device are configured to output the audio stream that is input from an online streaming source.

8. The system of claim 1, wherein said first network device and said second network device are each one of or a part of one of the following: a tablet, a smart phone, an energy management system, an energy management device, a personal computer, a consumer electronic device, a media device, a smart utility meter, an advanced metering infrastructure, a smart energy device, an energy display device, a home automation controller, an energy hub, a smart energy gateway, a set-top box, a digital media subscriber system, a cable modem, a broadband communication device, a fiber optic enabled communications device, a media gateway, a home media management system, a media server, a network server, a network storage device, a wireless speaker, a retail energy provider's server, a wholesale energy provider's server, a COOP energy provider's server, a retail business server, a commercial site server, an industrial site server, a multi-residential site server, a temporary lodging server, a hotel server, a motel server, a condominium server, a utility provider's server, which include waste, water, power or combinations thereof, an energy substation, a news media server, a weather server, an advertisement server or service provider, a network radio server or service provider, a network media server or service provider, a music server or server provider, a search engine server or service provider, an information server or service provider, a wireless information network device, a vehicle charging station, a renewable energy production device, a renewable energy control device, an energy storage management system, a smart appliance, an HVAC system, a water pump, a heat pump, a hot water heater, a thermostat (TSTAT), an energy controller, an irrigation system, a lighting system, an alarm system, a smart power outlet, an energy detection device, a garage door opening system or device, a power management device, a power measurement unit (PMU), an air handler, a wireless air damper, a humidity control system, a heat and motion sensing device, a smart power outlet, a switch router, a wireless router, an automobile or transportation device, or a network communication device.

9. The system of claim 1, wherein said customer engagement portal is configured to allow the user of the mobile device to create play lists of songs to be output by one or more of said first network device and said second network device.

10. The system of claim 1, wherein said at least one processor executes the instructions stored in said at least one memory to allow for synchronization with said mobile device.

11. The system of claim 1, wherein at least said first network device and said second network device are configured to output said media stream and said other media stream simultaneously.

12. The system of claim 1 wherein one of said first network device or said second network device is a thermostat and wherein said change of said operating condition includes altering a temperature set point of said thermostat.

13. A system for managing customer engagement, comprising:
a customer engagement portal to be disposed at a site, said customer engagement portal configured to receive multiple inputs, including inputs related to management of media information and management of non-media information that is independent of and unrelated to the media information;
at least one memory storing instructions;
at least one processor associated with said customer engagement portal and configured to execute the instructions stored in said at least one memory to manage the media information;
at least one network device to be disposed at said site and communicatively coupleable with said at least one processor to wirelessly receive streams of media, said at least one network device being configured to output said streams of media, including in response to and related to the media information; and
a mobile device associated with said site and configured to initiate a change in an operating condition of said at least one network device, wherein said change in said operating condition is in response to an input related to non-media information and is independent of and unrelated to said streams of media, said at least one network device being configured to output said streams of media simultaneously while said operating condition of said at least one network device is being changed;
a customer engagement platform communicatively coupleable with both said customer engagement portal and said mobile device, the customer engagement platform configured to provide the media information based on both a present location of said mobile device relative to said customer engagement portal and a tracked travel pattern of a user associated with the mobile device,
wherein the tracked travel pattern of the user includes a determined frequency of the user at the site and a previous movement of the user from one location to another location,
wherein said customer engagement portal and said at least one processor are integrated into said at least one network device.

14. The system of claim 13, wherein said streams of media include streams of audio and streams of video.

15. The system of claim 14, wherein at least a portion of said streams of audio includes music.

16. The system of claim 14, wherein said customer engagement portal is configured to allow the user associated with the mobile device to create play lists of songs to be output by said at least one network device.

17. The system of claim 13, wherein said at least one network device is configured to output the streams of audio from an online streaming source.

18. The system of claim 13, wherein said at least one network device is operable to transmit streams of media to said at least one processor.

19. The system of claim 13, further comprising:
a plurality of network device that are each in wireless communication with said at least one processor.

20. The system of claim 19, wherein said plurality of network devices are configured to play music at a same time.

21. The system of claim 19, wherein said plurality of network devices are configured to play different music at a same time.

22. The system of claim 13, wherein said at least one network device is one of or a part of one of the following: a tablet, a smart phone, an energy management system, an energy management device, a personal computer, a consumer electronic device, a media device, a smart utility meter, an advanced metering infrastructure, a smart energy device, an energy display device, a home automation controller, an energy hub, a smart energy gateway, a set-top box, a digital media subscriber system, a cable modem, a broadband communication device, a fiber optic enabled communications device, a media gateway, a home media management system, a media server, a network server, a network storage device, a wireless speaker, a retail energy provider's server, a wholesale energy provider's server, a COOP energy provider's server, a retail business server, a commercial site server, an industrial site server, a multi-residential site server, a temporary lodging server, a hotel server, a motel server, a condominium server, a utility provider's server, which include waste, water, power or combinations thereof, an energy substation, a news media server, a weather server, an advertisement server or service provider, a network radio server or service provider, a network media server or service provider, a music server or server provider, a search engine server or service provider, an information server or service provider, a wireless information network device, a vehicle charging station, a renewable energy production device, a renewable energy control device, an energy storage management system, a smart appliance, an HVAC system, a water pump, a heat pump, a hot water heater, a thermostat (TSTAT), an energy controller, an irrigation system, a lighting system, an alarm system, a smart power outlet, an energy detection device, a garage door opening system or device, a power management device, a power measurement unit (PMU), an air handler, a wireless air damper, a humidity control system, a heat and motion sensing device, a smart power outlet, a switch router, a wireless router, an automobile or transportation device, or a network communication device.

23. The system of claim 13, wherein said at least one processor further executes the stored instructions to allow for synchronization with said mobile device.

24. A method of managing customer engagement at a site, comprising:
associating a customer engagement portal with a site, said customer engagement portal configured to receive inputs regarding the site, including inputs related to media information and non-media information independent of and unrelated to the media information;
associating at least one processor with said customer engagement portal to execute instructions stored in at least one memory to manage said media information;
providing at least one network device that is integrated with said customer engagement portal and configured to receive media information and non-media information;
communicatively coupling both said associated customer engagement portal and a mobile device to provide media information based on both a present location of said mobile device relative to said associated customer engagement portal and a tracked travel pattern of a user associated with the mobile device, the tracked travel pattern of the user including a determined frequency of the user being at the site and a previous movement of the user form one location to another location;
wirelessly transmitting media information, including media streams between said at least one processor and said at least one network device;
initiating a change in an operating condition of said least one network device through said mobile device; and
outputting said media streams from said at least one network device simultaneously with said initiating said change in said operating condition, wherein said change in said operating condition is related to non-media information and independent and unrelated to the media information.

25. The method of claim 24, further comprising:
outputting audio streams and video streams from said plurality of network devices.

26. The method of claim 25, further comprising:
outputting audio from an online streaming source from each of said plurality of network devices.

27. The method of claim 24, wherein the at least one network device associated with the site is among a plurality of network devices that are associated with the site;
wirelessly transmitting media streams between said at least one processor and said plurality of network devices;
outputting said media streams from at least one of said plurality of network devices simultaneously with said initiating said change in said operating condition.

28. A system for managing customer engagement, comprising:
a customer engagement portal to be disposed at a site, said customer engagement portal configured to receive inputs, including inputs related to media information;
at least one memory storing instructions;
at least one processor associated with said customer engagement portal that executes the instructions stored in said at least one memory to manage said media information;
a first network device to be disposed at said site and in communication with said at least one processor to allow for wireless transmission of media streams therebetween, said first network device being configured to output said media streams, and said first network device having an operating condition capable of being altered;
a second network device to be disposed at said site and in communication with said at least one processor to allow for the wireless transmission of media streams therebetween, said second network device being configured to output said media streams, and said second network device having an operating condition capable of being altered; and
a mobile device associated with said site and configured to initiate a change of said operating condition of at least one of said first network device or said second network device while said at least one of said first network device or said second network device outputs said media streams,
wherein said operating condition is independent of and unrelated to said media streams, and
wherein said customer engagement portal is integrated into one of said first network device or said second network device,
wherein the least one processor further executes the instructions stored in said at least one memory to automatically determine a location of said mobile device relative to the site, and wherein said customer engagement platform is configured to initiate or stop use of the media streams by the first network device and the second network device in response to the determined location.

29. A system for managing customer engagement, comprising:
a customer engagement portal to be disposed at a site, said customer engagement portal configured to receive multiple inputs, including inputs related to management of media information and management of non-media information that is independent of and unrelated to the media information;
at least one memory storing instructions;
at least one processor associated with said customer engagement portal that executes the instructions stored in said at least one memory to manage the media information;
at least one network device to be disposed at said site and in communication with said at least one processor to wirelessly receive streams of media, said at least one network device being configured to output said streams of media, including in response to and related to the media information; and
a mobile device associated with said site and configured to initiate a change in an operating condition of said at least one network device, wherein said change in said operating condition is in response to an input related to non-media information and is independent of and unrelated to said streams of media, said at least one network device being configured to output said streams of media simultaneously while said operating condition of said at least one network device is being changed;
wherein said customer engagement portal and said at least one processor are integrated into said at least one network device,
wherein the least one processor further executes the instructions stored in said at least one memory to at least one processor that executes the instructions stored in said at least one memory to automatically determine a location of said mobile device relative to the site; and
wherein said customer engagement platform is configured to initiate or stop use of the media streams by the at least one network device in response to the determined location.

* * * * *

UNITED STATES PATENT AND TRADEMARK OFFICE
CERTIFICATE OF CORRECTION

| | | |
|---|---|---|
| PATENT NO. | : 10,250,520 B2 | Page 1 of 1 |
| APPLICATION NO. | : 13/600086 | |
| DATED | : April 2, 2019 | |
| INVENTOR(S) | : Kevin R. Imes et al. | |

It is certified that error appears in the above-identified patent and that said Letters Patent is hereby corrected as shown below:

On the Title Page

Item (56), Line 1, In Other Publications, after "Trundle," delete "Joseph" and insert -- Stephen --, therefor.

In the Claims

Column 31, Line 44, In Claim 8, delete "server provider," and insert -- service provider, --, therefor.

Column 33, Line 28, In Claim 22, delete "server provider," and insert -- service provider, --, therefor.

Signed and Sealed this
Twenty-first Day of July, 2020

Andrei Iancu
*Director of the United States Patent and Trademark Office*